(12) United States Patent
Murphey et al.

(10) Patent No.: US 12,099,219 B2
(45) Date of Patent: Sep. 24, 2024

(54) WRINKLE FREE FOLDABLE REFLECTORS MADE WITH COMPOSITE MATERIALS

(71) Applicants: Thomas W. Murphey, Fort Collins, CO (US); Patrick A. Rodriguez, Fort Collins, CO (US)

(72) Inventors: Thomas W. Murphey, Fort Collins, CO (US); Patrick A. Rodriguez, Fort Collins, CO (US)

(73) Assignee: Opterus Research and Development, Inc., Fort Collins, CO (US)

( * ) Notice: Subject to any disclaimer, the term of this patent is extended or adjusted under 35 U.S.C. 154(b) by 0 days.

(21) Appl. No.: 18/230,411

(22) Filed: Aug. 4, 2023

(65) Prior Publication Data

US 2023/0384492 A1 Nov. 30, 2023

Related U.S. Application Data

(62) Division of application No. 17/183,550, filed on Feb. 24, 2021, now Pat. No. 11,892,661.

(Continued)

(51) Int. Cl.
*G02B 5/10* (2006.01)
*G02B 27/00* (2006.01)
*B64G 1/44* (2006.01)

(52) U.S. Cl.
CPC .......... *G02B 5/10* (2013.01); *G02B 27/0012* (2013.01); *B64G 1/443* (2013.01)

(58) Field of Classification Search
CPC ........ G02B 5/09; G02B 5/10; G02B 27/0012; H01Q 15/16; H01Q 15/161; H01Q 15/165; H01Q 15/166; H01Q 15/20

(Continued)

(56) References Cited

U.S. PATENT DOCUMENTS 3,174,397 A  3/1965 Sanborn
3,360,798 A  12/1967 Webb
(Continued)

FOREIGN PATENT DOCUMENTS

EP   1275171 B1   1/2006

OTHER PUBLICATIONS

ISA/US International Search Report and Written Opinion issued in corresponding International Application No. PCT/US21/19519 dated Jan. 5, 2022 (15 pgs).

(Continued)

*Primary Examiner* — Ricky D Shafer
(74) *Attorney, Agent, or Firm* — Harris Beach PLLC

(57) ABSTRACT

A doubly curved reflector for compact storage in a folded state includes a plurality of gores, each gore having on either long side a gore side curve. At least one hinge is mechanically coupled between each adjacent gore, the at least one hinge including a fold roll hinge or a living hinge. In a stowed doubly curved reflector state each gore folds about the at least one hinge when folded closed such that a face surface of each gore folds against an adjacent face surface of another gore into a substantially cylindrical structure. In a deployed doubly curved reflector state, each hinge. A doubly curved reflector for compact storage in a folded state and a locked open state, a method of manufacture, and a method for designing a substantially wrinkle free doubly curved foldable reflector having gores of a composite material are also described.

14 Claims, 24 Drawing Sheets

Related U.S. Application Data

(60) Provisional application No. 62/982,214, filed on Feb. 27, 2020.

(58) Field of Classification Search
USPC .............. 359/846, 850, 853, 865, 868, 869
See application file for complete search history.

(56) References Cited

U.S. PATENT DOCUMENTS

| | | | |
|---|---|---|---|
| 3,397,399 A | 8/1968 | Carman et al. | |
| 3,617,113 A | 11/1971 | Hoyer | |
| 3,699,576 A | 10/1972 | Hoyer | |
| 4,030,102 A | 6/1977 | Kaplan et al. | |
| 4,201,991 A * | 5/1980 | Vines ................... | H01Q 15/161 343/915 |
| 4,315,265 A | 2/1982 | Palmer et al. | |
| 4,780,726 A | 10/1988 | Archer et al. | |
| 4,815,525 A * | 3/1989 | Readman ............... | B64G 1/503 244/172.6 |
| 4,899,167 A * | 2/1990 | Westphal ............. | H01Q 15/162 343/915 |
| 5,296,044 A | 3/1994 | Harvey et al. | |
| 5,488,383 A | 1/1996 | Friedman et al. | |
| 6,152,579 A | 11/2000 | Reed et al. | |
| 6,206,551 B1 | 3/2001 | Stubblefield, Jr. | |
| 7,354,033 B1 | 4/2008 | Murphey et al. | |
| 8,462,078 B2 | 6/2013 | Murphey et al. | |
| 9,331,394 B2 * | 5/2016 | Toledo ................ | H01Q 15/162 |
| 10,236,590 B1 | 3/2019 | Footdale et al. | |
| 11,892,661 B2 * | 2/2024 | Murphey ............... | B64G 1/222 |
| 2004/0104861 A1 | 6/2004 | Schmid et al. | |
| 2012/0146873 A1 | 6/2012 | Murphey et al. | |
| 2021/0372464 A1 | 12/2021 | Murphey | |

OTHER PUBLICATIONS

Datashvili, Leri, et al. "Structural Solutions of Deployable Antennas for Small Satellites", 2019, 13th European Conference on Antennas and Propagation (EUCAP), European Association on Antennas and Propagation, Mar. 31, 2019, pp. 1-4.

Extended European Search Report in related EP Application No. 21808442.4 dated Feb. 26, 2024 [11 pages].

Nojima, T. "Origami Modeling of Functional Structures based on Organic Patterns", Kyoto University (2002).

Nojima, T., "Modelling of compact Folding/Wrapping of flat circular membranes (folding patterns of equiangular spirals)." JSME International Journal Series C Mechanical Systems, Machine Elements and Manufacturing 46.4 (2003): 1547-1553.

* cited by examiner

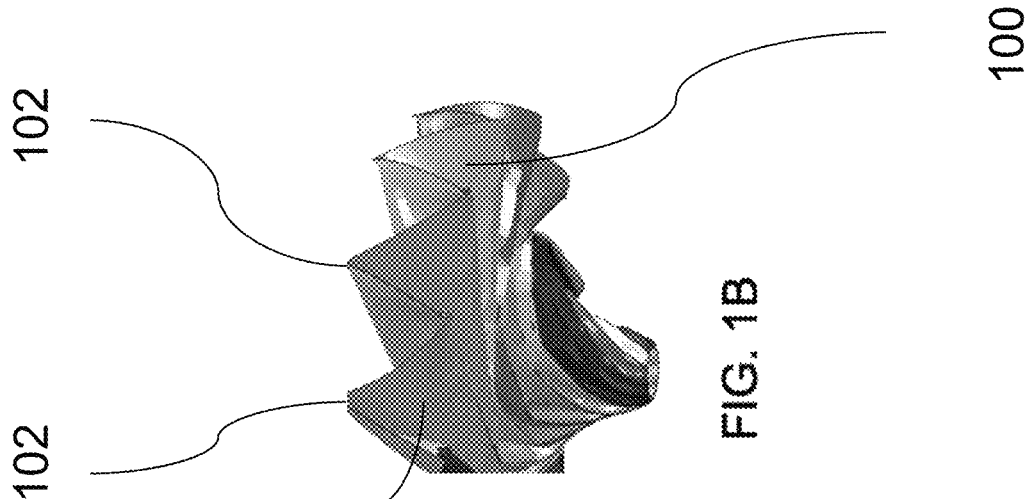
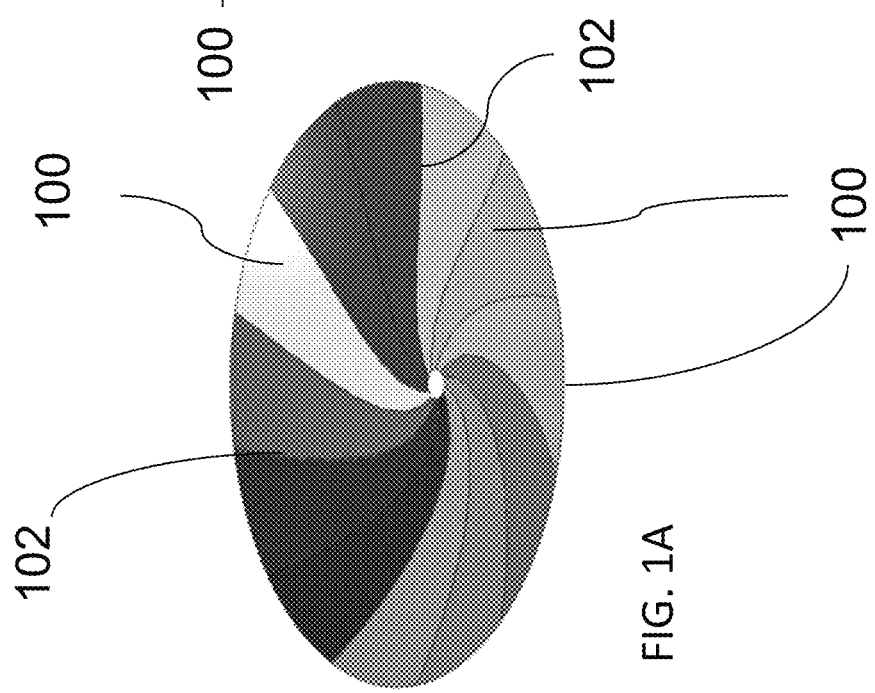

FIG. 4B
FIG. 4A

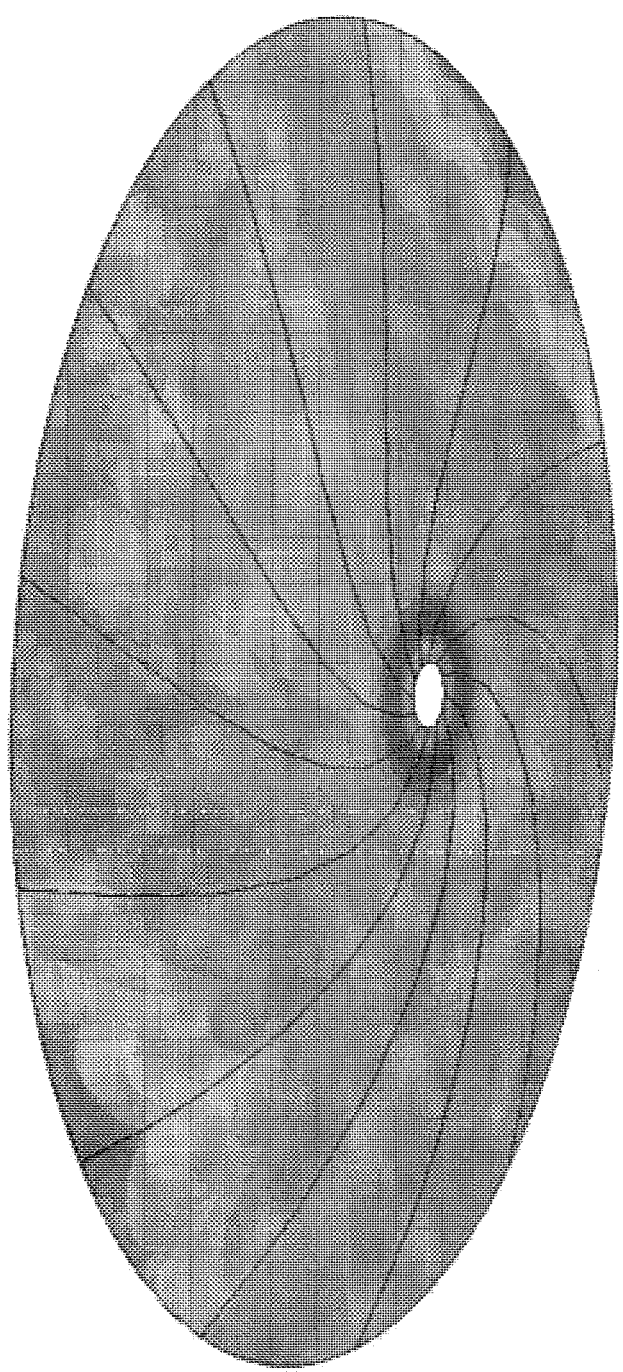
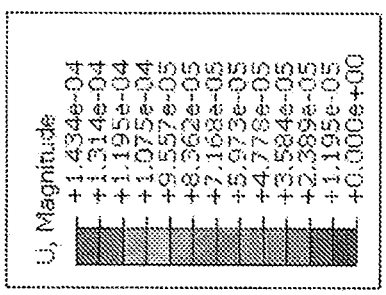
FIG. 7

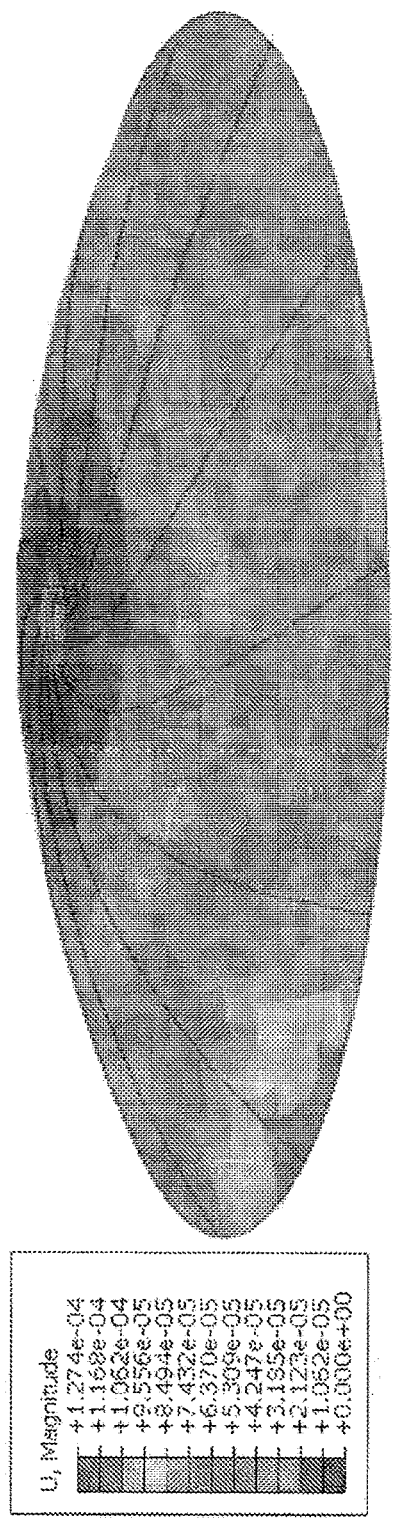
FIG. 9A  DSC gravity deformation analysis in cup-down configuration
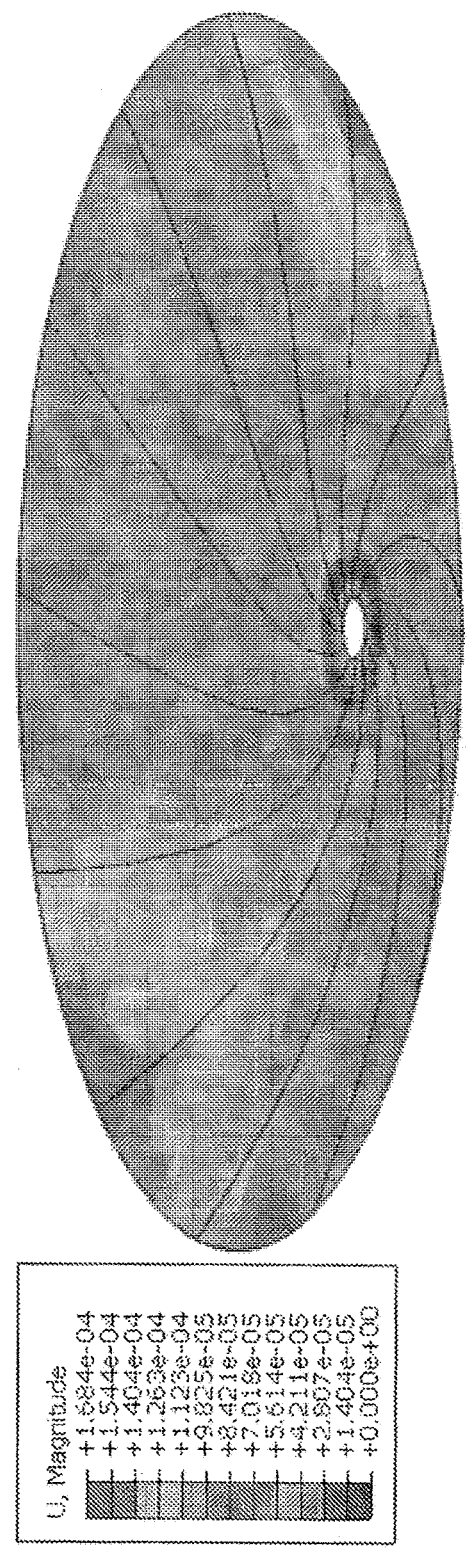
FIG. 9B  DSC gravity deformation analysis in cup-up configuration

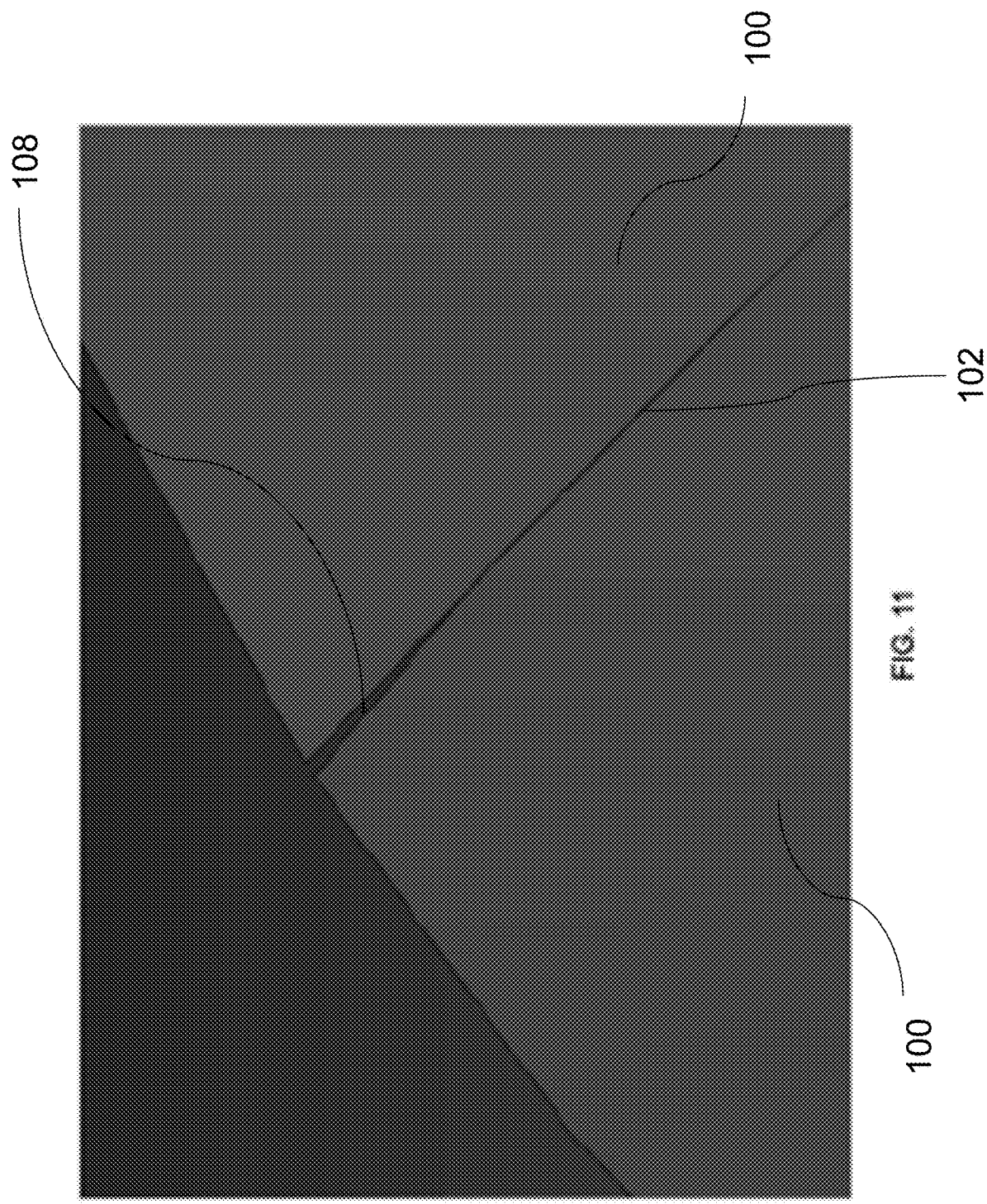

112

WRINKLE FREE FOLDABLE REFLECTORS MADE WITH COMPOSITE MATERIALS

CROSS-REFERENCE TO RELATED APPLICATIONS

This application is a divisional of U.S. patent application Ser. No. 17/183,550, filed Feb. 24, 2021, which claims priority to and the benefit of U.S. provisional patent application Ser. No. 62/982,214, WRINKLE FREE FOLDABLE REFLECTORS MADE WITH COMPOSITE MATERIALS, filed Feb. 27, 2020, which applications are incorporated by reference herein it their respective entireties.

STATEMENT REGARDING FEDERALLY FUNDED RESEARCH OR DEVELOPMENT

This invention was made with government support under 80NSSC19C0338 awarded by NASA. The government has certain rights in the invention.

FIELD OF THE APPLICATION

The application relates to foldable reflectors, particularly to foldable reflectors with gores.

BACKGROUND

Reflectors are useful, particularly in space and planetary application ranging from solar concentrators to radio antennas. Transport by rocket and spacecraft is expensive by volume and weight. Most reflectors for space based applications are made of lightweight materials and folded for transport.

SUMMARY

A doubly curved reflector for compact storage in a folded state includes a plurality of gores, each gore having on either long side a gore side curve. At least one hinge is mechanically coupled between each adjacent gore, the at least one hinge including a fold roll hinge or a living hinge. In a stowed doubly curved reflector state, each gore folds about at least one hinge when folded closed such that a face surface of each gore folds against an adjacent face surface of another gore into a substantially cylindrical structure. In a deployed doubly curved reflector state, each hinge is open such that a face surface of each gore provides a doubly curved reflector surface.

The doubly curved reflector surface can include a substantially wrinkle free reflector surface.

The doubly curved reflector can include at least one of a parabola curve, a circular curve, a hyperbola curve, an elliptical curve or a cup shape and combinations thereof.

The at least one fold roll hinge can include at least one stress relieving hinge slit.

The at least one stress relieving hinge slit can include a transverse stress relieving hinge slit.

The doubly curved reflector further can include a slot between each of the gores extending over about an outer 10% or less towards an outside diameter of each of a plurality of fold lines.

The slot can include a V shaped slot or a U shaped slot.

The doubly curved reflector can include a perimeter structure to positively bias the doubly curved reflector to the deployed doubly curved reflector state.

The perimeter structure can include a C shape spring.

A doubly curved reflector for compact storage in a folded state and a locked open state includes a plurality of gores, each gore having on either long side a gore side curve. At least one hinge is mechanically coupled between each adjacent gore. A perimeter structure includes a curved deformable spring. In a stowed doubly curved reflector structure state, each gore folds about the at least one hinge when folded closed such that a face surface of each gore folds against an adjacent face surface of another gore into a substantially cylindrical structure, and the perimeter structure is folded and deforms around the substantially cylindrical structure. In a deployed doubly curved reflector structure locked open state, each hinge is open such that a face surface of each gore is disposed in a doubly curved reflector surface, and the perimeter structure spring biases the doubly curved reflector surface towards the deployed doubly curved reflector structure locked open state.

The curved deformable spring can include a C curve or any other cross section that flattens for folding.

The curved deformable spring can fold in Z folds around the substantially cylindrical structure in the stowed doubly curved reflector structure state.

The perimeter structure can include TEE slots.

The perimeter structure can include a TS edge.

A method of manufacture of a doubly curved reflector for compact storage in a folded state includes: providing a plurality of prepreg draping gore, each prepreg draping gore having on either long side a gore side curve, and at least one hinge mechanically coupled between each adjacent gore; draping each prepreg draping gore over a doubly curved form structure; arranging the at least one hinge between adjacent gores along a gore fold line; layering on a carbon epoxy material in successive layers; curing a hinged doubly curved reflector on the doubly curved form structure; and removing a cured foldable doubly curved reflector from the doubly curved form structure.

The step of providing can include providing at least one fold roll hinge.

The step of providing can include providing at least one living hinge.

A method for designing a substantially wrinkle free doubly curved foldable reflector having gores of a composite material includes: calculating by a computer a plurality of geometric gore fold lines for a foldable doubly curved reflector using a foldable doubly curved reflector computer model which does not account for material properties; calculating by the computer using a finite element analysis model both a folded state and a deployed state of the foldable doubly curved reflector based on the plurality of geometric gore fold lines and material properties of a material from which the gores are to be manufactured; changing a slope of at least a portion of a gore line of the plurality of geometric gore fold lines; and repeating the step of calculating by the computer using the finite element analysis model and the step of changing the slope of the geometric gore fold lines at an end of each gore fold line until the foldable doubly curved reflector is substantially wrinkle free in a folded doubly curved reflector stowed state.

Calculating by a computer geometric gore fold lines for the foldable doubly curved reflector can include calculating by the computer geometric gore fold lines for the foldable doubly curved reflector based on a desired outer perimeter, inner perimeter, depth of reflector, and thickness of each gore.

Calculating by the computer using the finite element analysis model can include calculating by the computer using the finite element analysis model based on material deformation properties of composite materials.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

FIG. 1A shows an exemplary deployed reflector according to the Application;

FIG. 1B shows the reflector of FIG. 1A in a mid-packing state;

FIG. 1C shows the reflector FIG. 1A in a packed state;

FIG. 4A is a drawing showing an exemplary carbon fiber fold-roll hinge in an open flat state;

FIG. 4B is a drawing showing the hinge of FIG. 4A in folded state;

FIG. 7 is a drawing showing an exemplary DSC thermal soak deformation analysis;

FIG. 9A is a drawing showing an exemplary DSC gravity deformation analysis in a cup-down configuration;

FIG. 9B is a drawing showing an exemplary DSC gravity deformation analysis in a cup-up configuration;

FIG. 11 is a drawing showing a V shaped slot at the outer edges of a reflector;

DETAILED DESCRIPTION

Figure 2B:
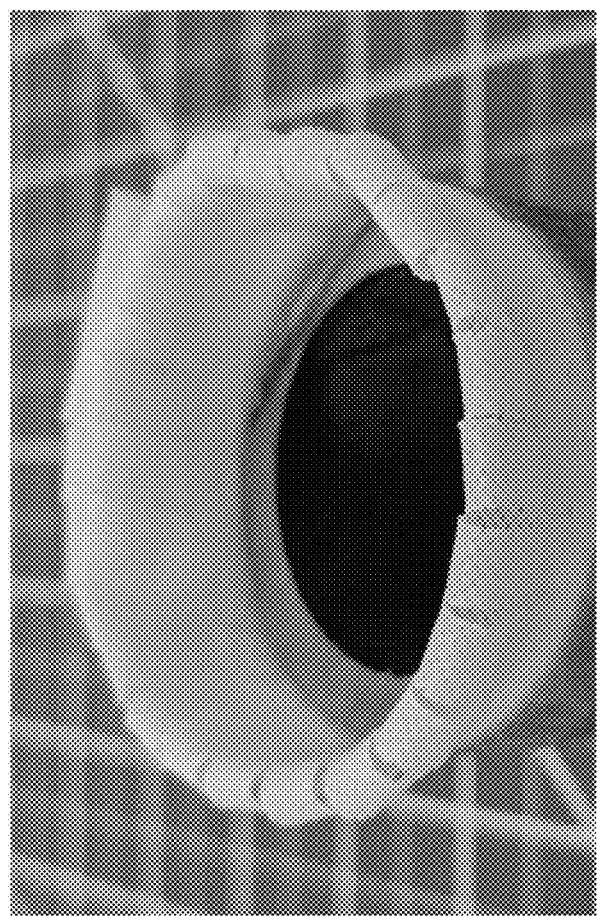
FIG. 2B is a drawing showing another exemplary fold-roll hinge in closed and rolled state.

In the description, other than the bolded paragraph numbers, non-bolded square brackets ("[ ]") refer to the citations listed hereinbelow.

Definitions

Flat surface—A flat surface as used hereinbelow is a layer of some thickness disposed in plane. For example, a flat sheet of paper, or a flat sheet of thin stainless steel.

Singly curved surface—A singly curved surface has a radius in one plane. For example, a sheet of copy paper gently folded over without wrinkles is an example of a singly curved surface.

Doubly curved surface—A doubly curved surface has radii in more than one plane. Most reflectors, such as parabolic reflectors are examples of doubly curved surfaces.

Fold lines—Reflectors of the Application are made from a plurality of gores. Each gore has curved fold lines on either side of the gore section, also known as gore lines, and interchangeably referred to herein as the gore side curve. The curvature of the gore side curve is different from and should not be confused with the overall doubly curved surface of the reflector.

Gore lines—Gore line or gore side curve are used interchangeably with gore curves or fold lines where there are a plurality of gores. The curvature of the gore lines or fold lines is different from and should not be confused with the overall doubly curved surface of the reflector.

Doubly folded and fold modes—Reflectors described hereinbelow fold in at least two modes. First, each gore folds alternately against each other gore by hinges. Then, the entire reflector of gores rolls into a cylindrical shape for storage. Doubly folded is different from and should not be confused with the overall doubly curved surface of the reflector. Moreover, where there is an additional perimeter structure, such as, for example, a C curved perimeter spring, there can be yet another fold mode, where, for example, an outer C curved perimeter spring folds in Z folds about the outside of the folded cylinder.

As described hereinabove, most reflectors designed for space based applications are made of lightweight materials and folded for transport.

One foldable reflector of the prior art has been based on loosely coupled interlocked cut gores, such as was described in U.S. Pat. No. 8,462,078, to Murphey, et al. and assigned to the U.S. Air Force. In this earlier work by one of the inventors of the application, a parabolic reflector antenna was created by nestingly interlocking a number of individually cut and loose gores by use of flexible bands threaded through holes in each gore (e.g., '078 patent, FIG. 4B). The individual cut gores of the '078 patent included relatively complex curves. Also, the gores were only interlocked by the flexible bands threaded through holes in each gore, not continuously coupled along the edges of the gores.

Flat sheet Origami folding—Others have focused on faceted designs, such as the Origami inspired flat sheet designs described by T. Nojima in Origami Modeling of Functional Structures based on Organic Patterns, and later in Modelling of Compact Folding/Wrapping of Flat Circular Membranes, which describe the folding/wrapping methods of thin flat circular membranes using folding patterns prescribed by combining two groups of spirals. By using both folding conditions at nodes and continuous conditions of equiangular spiral fold lines in the membranes, two kinds of folding patterns have been analytically designed: (1) folding patterns consisting of pseudo-equiangular spirals (zigzag spirals) and equiangular spirals, and (2) folding patterns consisting of two groups of equiangular spirals. As reported by Nojima, the applicability of the present Nojima folding/wrapping methods to circular membranes was verified by manufacturing paper and very thin metal sheet samples. Nojima's work is in singly curved flat surfaces and has been largely theoretical, with some experimental testing. FIG. 1 (prior art) shows Nojima's FIG. 10 to FIG. 12 which tested a folding pattern consisting of equiangular spirals without facets in a zig zag pattern which is then rolled.

Nojima's gores follow relatively simple curves suitable for zig zag folding of flat sheets of stainless steel. Unfortunately, the relatively simple curves which work in thin flat steel sheets, do not translate well to lighter composite materials which have very different structural and elastic properties comparted to steel sheets. Nojima's work is primarily kinematic and does not take into account material deformation.

As described hereinbelow, new curves which allow for doubly curved patterns for folding for transport in lighter composite materials were realized by finite element analysis based on the structural properties of composite materials, material properties of materials and the elastic properties of the materials. These new curves allow for composite material reflectors which can deploy as doubly curved deployed structures, such as parabola reflector surfaces.

The new curves are combined with new hinge technologies which in contrast with the interlocked separate cut gores of the prior art, now continuously couple each gore along both edges of each gore by hinges. These new composite reflector structures can be manufactured as monolithic structures, such as by applying epoxy and carbon materials on prepreg gores formed over a mold having the shape of the desired open reflector shape.

For smaller reflectors, a living hinge solution was realized, where relatively light weight composite gores are continuously joined edge to edge during manufacture by a thin material, such as, for example, thin strips of Kapton. The Kapton strip living hinges, become an integral part of the new structure in the manufacturing process, resulting in composite monolithic doubly foldable reflector, which unfurls into a single curved reflector.

For larger reflectors, a fold-roll hinge was realized which similarly joins each relatively light weight composite gore along the length of each side edge to create post-manufacture, another monolithic structure which also folds as a doubly foldable reflector, and which unfurls into a doubly curved reflector.

Several exemplary reflectors of the Application are described in the context of a deployable solar concentrator (DSC), however it will be understood that such reflectors can be manufactured for and used in any other suitable application.

NASA, for example, has identified a need for improved technologies to extract oxygen from lunar regolith, in support of in situ production of breathing air and spacecraft propellants for a future lunar station. The Application describes suitable solutions for lightweight solar concentrator technologies, which work together with secondary concentrators and reactors to produce oxygen from regolith. For example, the Application describes a lightweight, packing reflector-style deployable solar concentrator (DSC) with an estimated power per unit mass of 2,980 W/kg, which is expected to be able to achieve reflectivities of 0.8-0.9.

Part 2.1 describes a new reflector structure, and the technical feasibility of the concept. Part 2.2 compares the new reflector to the prior art, and Part 2.3 discusses exemplary applications of the new reflector structure.

Part 2.1—Doubly folded, doubly curved reflectors typically made of composite materials—The exemplary reflector structure of Part 2.1 can be used, for example, in a DSC application. The DSC can include a high strain composite (HSC) solid surface spiral wrapped parabolic solar concentrator as shown in FIG. 1A to FIG. 1C. FIG. 1A shows an exemplary deployed reflector according to the Application. FIG. 1B shows the reflector of FIG. 1A in a mid-packing state. FIG. 1C shows the reflector FIG. 1A in a packed state. This new spiral wrapped paraboloid in combination with high strain composite (HSC) fold-roll hinges or high strain composite living hinges provides a reflector solution which is low cost, lightweight, can pack tightly, and which can achieve high radiation concentration factors.

Figure 2A:
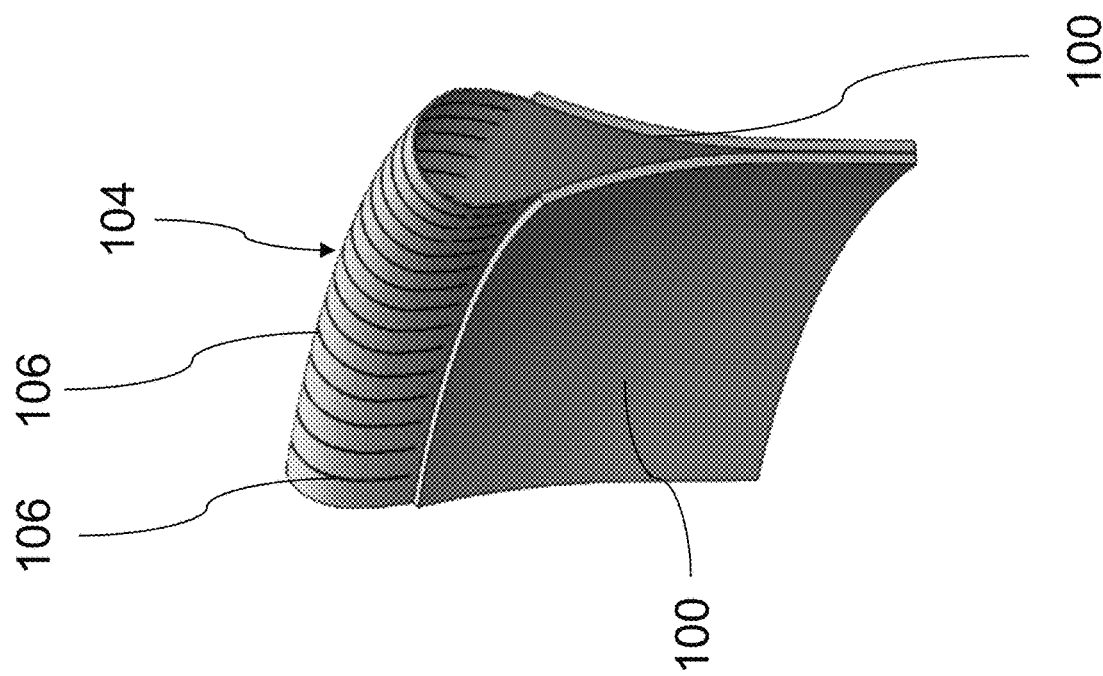
FIG. 2A is a drawing showing an exemplary fold-roll hinge.

This new spiral wrapped paraboloid includes the fold pattern shown in FIG. 1A to FIG. 1C, which folds gores 100 along living hinges 102 from a deployed reflector state to a parabola then into a tight circular disk, an HSC fold-roll hinge, shown in FIG. 2A and FIG. 2B. FIG. 2A is a drawing showing an exemplary fold-roll hinge 104 between adjacent gores 100. FIG. 2B is a drawing showing another exemplary fold-roll hinge 104 in closed and rolled state.

Figure 3B:
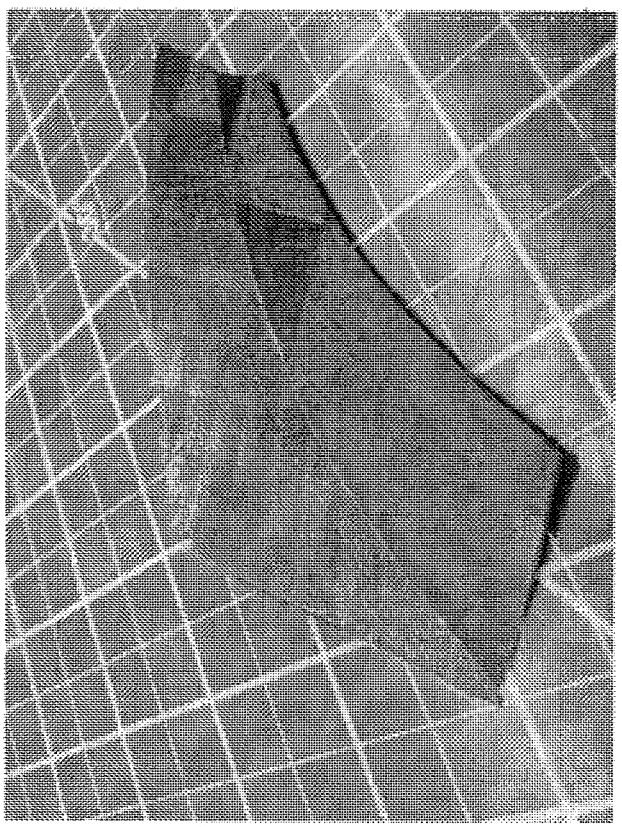
FIG. 3B is a drawing of the hinge of FIG. 3A in a closed and rolled state.
Figure 3A:
FIG. 3A is a drawing of an exemplary living hinge in an open position.

For large parabolic reflectors, and a living hinge, shown in FIG. 3A and FIG. 3B, for small parabolic reflectors. FIG. 3A is a drawing of an exemplary high strain composite living hinge in an open position. FIG. 3B is a drawing of the hinge of FIG. 3A in a closed and rolled state.

As used herein, "small reflectors" are under about 2 m in diameter, and typically under 1 m diameter. "Large" reflectors are over about 1 m in diameter, and typically larger than 2 m in diameter. For example, Direct TV receiving dishes are small, about 28" across, while many deployed mesh reflectors are typically 3 m and larger diameter.

The new fold pattern includes a doubly curved reflector shell surface, to achieve a typically paraboloid shape, that folds along curved hinged fold lines.

The best type of hinge for this type of fold depends on the scale of the reflector being stowed. Two exemplary hinge types are described herein. The first hinge is a roll-fold hinge typically best suited to larger diameter reflectors, and the second hinge is an embedded living hinge typically best suited to smaller diameter reflectors. Because the hinge lines fold in two directions (first folding over 180°, then rolling around a relatively large diameter), the lines would normally require very large material strains. However, as described hereinbelow, HSC fold-roll hinges have been realized that enable, for example, a 1 m DSC to stow in a cylinder 200 mm diameter by 150 mm long.

Two characteristics for the fundamental operation of a solar concentrator are, the total amount of power reflected, and the extent to which that power is concentrated, which is quantified by the concentration ratio. The total amount of power is most strongly determined by the size of the reflector, while the concentration ratio is affected by the shape accuracy of the reflector and the characteristics of the reflective surface.

Technical elements of interest in fabricating doubly curved reflectors according to the Application include, coefficient of thermal expansion (CTE), reflectivity, mass, stiffness/strength, and hinges.

Coefficient of Thermal Expansion (CTE)—Shape error due to thermal expansion is where the CTE of composite structures can be controlled by altering the layup. A layup should be used that minimizes CTE, while retaining sufficient structural stiffness, to minimize shape error.

Reflectivity—reflective coatings can be applied to composites through physical vapor deposition or electroplating (on top of an applied conductive layer). The reflectivity of the final surface can be strongly influenced by the finish of the final composite part. Physical vapor deposition literature indicates that reflectivities up to 0.9 can be used for composite parts with a glass-smooth finish, however, for example, a power-weight ratio estimate (2980 W/kg) can assume a more conservative reflectivity of 0.8.

Mass—A 1 m shell with 24 gores is estimated to have a shell mass of 95 g, prior to vapor deposition. The low mass of the system is possible due to the use of extremely thin ply composites, made of extremely stiff fibers. Additional resin can be used to ensure a smooth surface, as well as the reflective coating. Additional resin increases the mass, however even conservatively allowing for a 2× increase in mass, the mass of the reflective shell is very low.

Stiffness/strength—The stiffness of the reflector can come from the stiffness of composite materials, and the geometric stiffness of the structure. Folding indicates that the shell should be thin, however the overall structure should remain stiff due to the extreme stiffness of the composite fibers, as well as the geometric stiffness of the parabolic shape.

Hinges—One fold-roll hinge of the Application is made possible in part by use of stress relieving transverse hinge slits. These slits substantially eliminate strains associated with the roll of a doubly folded reflector. Stress relieving transverse hinge slits 106 have been demonstrated, for example, on a thin plain weave fused quartz fiber composite (FIG. 2A, FIG. 2B) and tested in a more realistic carbon fiber composite (FIG. 4A, FIG. 4B).

Figure 5:
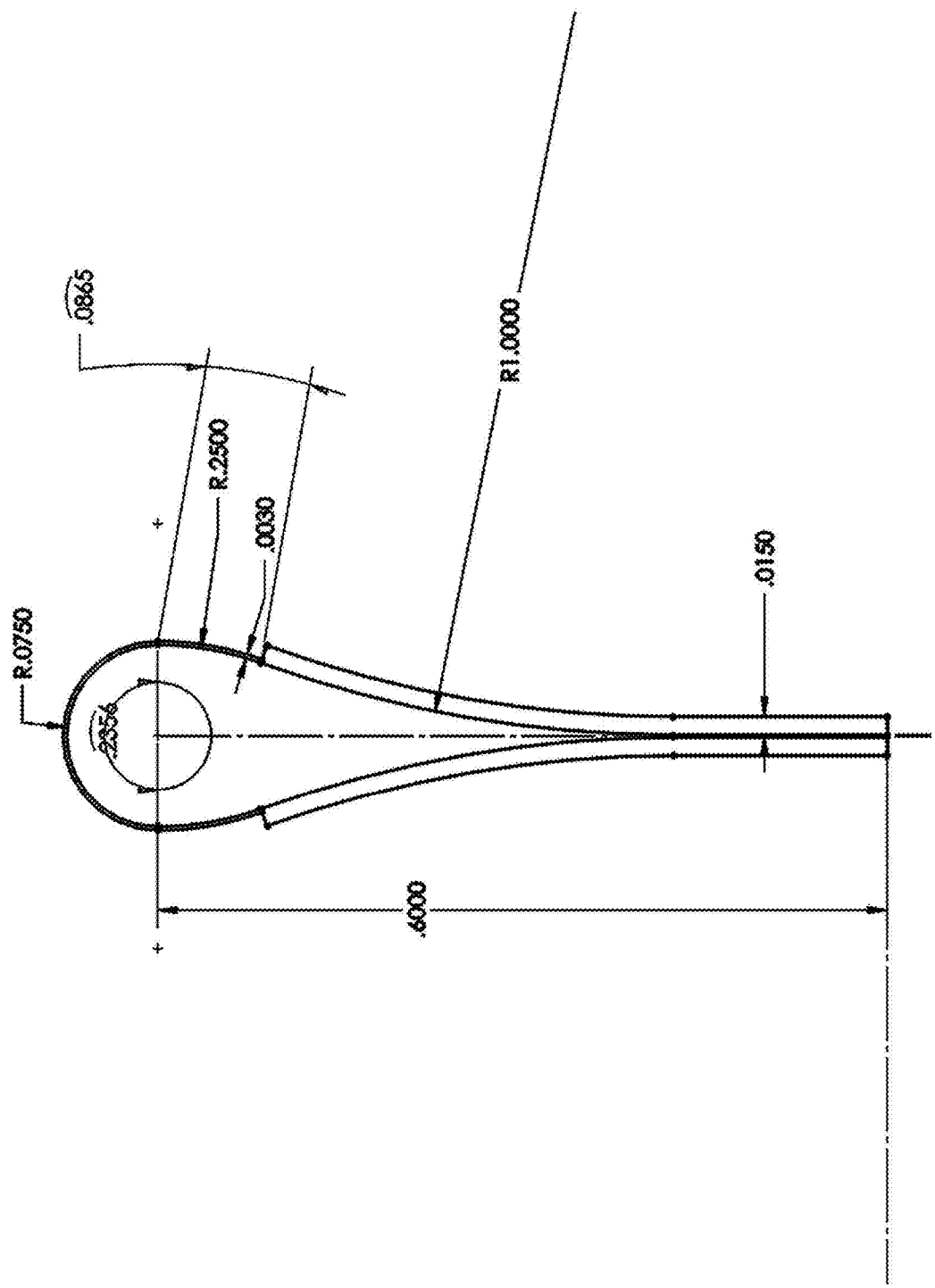
FIG. 5 is a drawing showing exemplary dimensions of a fold-roll hinge.

FIG. 5 is a drawing showing a baseline hinge geometry of an exemplary fold-roll hinge according to the Application. The gore sections will typically have a thicker laminate with increased bending stiffness. With the described folding pattern, half of these gores will back-bend (opposite sense bending). Experience in development has shown this deformation is easily accommodate in moderately thin HSC shells. Ultra-thin shells (gores) can lock into a reverse buckled shape, however at the typical thicknesses typically used here, combined with narrow and flat gore segments, the shells do not lock in the wrong shape.

Thicker regions can use thin carbon and glass composites, for example, with a nominal thickness of 0.010 in to 0.015 in. The hinge region is typically much thinner, for example, approximately 0.0022 in. This hinge region can be implemented with a single ply of 60 g/m2 fiber area weight unidirectional intermediate modulus carbon fiber. The folded hinge diameter (effective folding thickness) of the exemplary hinge of FIG. 5 is 0.150 in and results in a bending strain of 1.47%. This is well within the limits of thin unidirectional laminas, which typically fail at bending strains of over 2%. [1, 2]

FIG. 4A is a drawing showing an exemplary carbon fiber fold-roll hinge in an open flat state. FIG. 4B is a drawing showing the hinge of FIG. 4A in folded state. FIG. 4A and FIG. 4B are drawings of an exemplary two-ply plain weave carbon fiber coupon (0.0031 in thick; four fiber layers) bending to a diameter of 0.13 in, which is smaller than needed here (0.15 in), even though is significantly thicker than needed. Despite the hinge thinness, the hinge of FIG. 4A, FIG. 4B behaves as stiff, traditional shell structure that can securely tie the shell gores together. This hinge does not behave like a thin membrane because of the use a high modulus (180 GPa), and dimensionally stable carbon fiber composite, and because the hinge is very narrow at only about 0.41 in wide when flattened. Additional stiffening is gained from the doubly curved parabolic dish shape.

Example—The exemplary DSC model of FIG. 1A-FIG. 1C is 1 m diameter, has an f/D of 0.5, uses 24 gores and hinges, and has an estimated shell mass of 95 g. This results in an outer gore width and equivalent packaged height of 131 mm Packaged dimensions can be estimated from the number of gores and hinge diameter. In the worse-case, half of the hinges (12 peak or 12 valley hinges) will co-wrap and lie on top of each other. The gores wrap 1.5 times so that 18 fold-rolls will stack up for a total thickness of 68.6 mm, allowing for an inside diameter of 50 mm results in an outside diameter of 187 mm.

The DSC readily scales with the fold-roll hinges being the primary limitation. Smaller diameter reflectors will stow within a 1 U volume. Packaging improves as the diameter increases and hinge diameter is less constraining. This DSC can scale to larger diameters, 5 m for example, however, in some cases, back side stiffening elements should be added depending on materials and DSC.

Smaller-scale reflectors can be made with a living hinge. A living hinge, which consists of a hinge material embedded between two reflector gores, allows small gores to fold over and roll (See for example, FIG. 3A, FIG. 3B). The hinge material is typically sufficiently thin that the fold radius is negligible, which allows for a tighter fold (though not necessarily a tighter roll) than the fold-roll hinge.

If a fold-roll hinge with stress relief slits is used, the hinge stress relief slits can be allowed to form naturally. For example, if the hinge laminate is a single ply of unidirectional (UD) material with the fiber direction running perpendicular to the hinge length, the strength of thin plies in the direction perpendicular to the fiber is low, and it will naturally form stress relief cracks parallel to the fibers. Hinge stress relief slits can also be made by laser or abrasively cut, using CNC processes well-suited to HSC structures, and any by any other suitable methods or processes.

Reflector (typically a parabolic shell) Design—There are multiple hinge line patterns that will fold successfully. However, specific fold patterns determine the stowed shape.

Figure 6B:
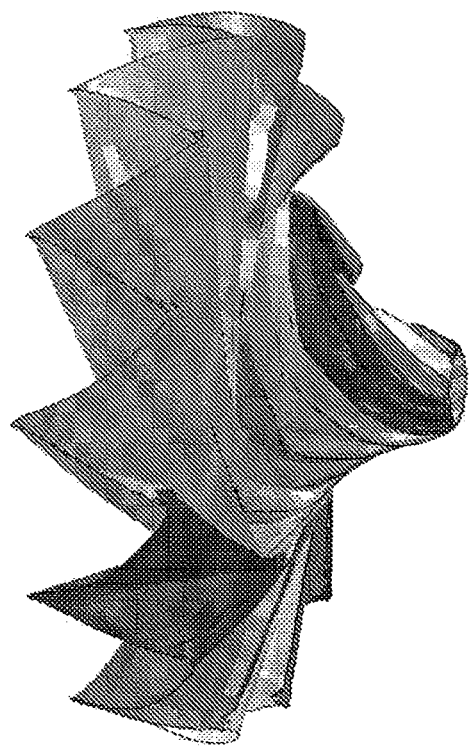
FIG. 6B is a drawings showing an exemplary DSC biased for a low center.
Figure 6A:
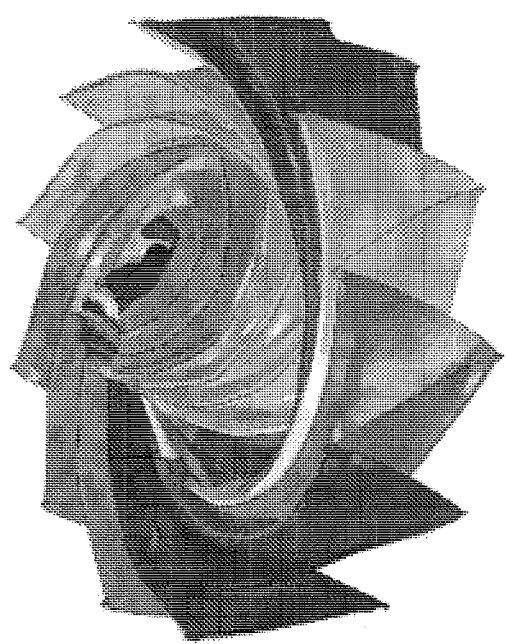
FIG. 6A is a drawings showing an exemplary DSC biased for a high center.

FIG. 6A and FIG. 6B show stow patterns that are biased high and low and demonstrate the potential to customize stowed shapes. FIG. 6A is a drawings showing an exemplary DSC biased for a high center. FIG. 6B is a drawings showing an exemplary DSC biased for a low center. Biasing the stowed shape allows the reflector to be packaged tightly with additional hardware, such as secondary optics or mounting hardware.

3D printed SLA parts with high temperature resin can be used as tooling in the production of parts for reflectors according to the Application. Molds of sections and/or the open reflector can be designed based on the FEA predictions and can include features to precisely shape and locate prepreg shapes. Prepregs include, for example, fabric reinforcement materials cut to a desired shape (e.g., a gore) that have been pre-impregnated with a resin. Such processes have been used in to test both a fold-roll and a living hinge single-section designs. A simple flat-plate fold-roll hinge was fabricated and shown to behave as expected. The hinge folded over and failed at a bending strain of approximately 2.5%. A living hinge was also fabricated and shown to fold.

A DSC according to the Application can be constructed entirely from very low coefficient of thermal expansion (CTE) materials to minimize thermal deformations. A laminate should have an effective in-plane CTE of less than 1 ppm/° C. in all directions. Assuming a uniform temperature change of 100° C., the reflector should scale by 0.01%, or a diameter change of 0.1 mm Thermal deformation analyses can also be performed.

FIG. 7 is a drawing showing an exemplary DSC thermal soak deformation analysis. A preliminary analysis, with the hinge UD lamina accurately modeled, but using a quasi-isotropic shell yields a similar maximum deformation of 0.14 mm, FIG. 7.

Figure 8:
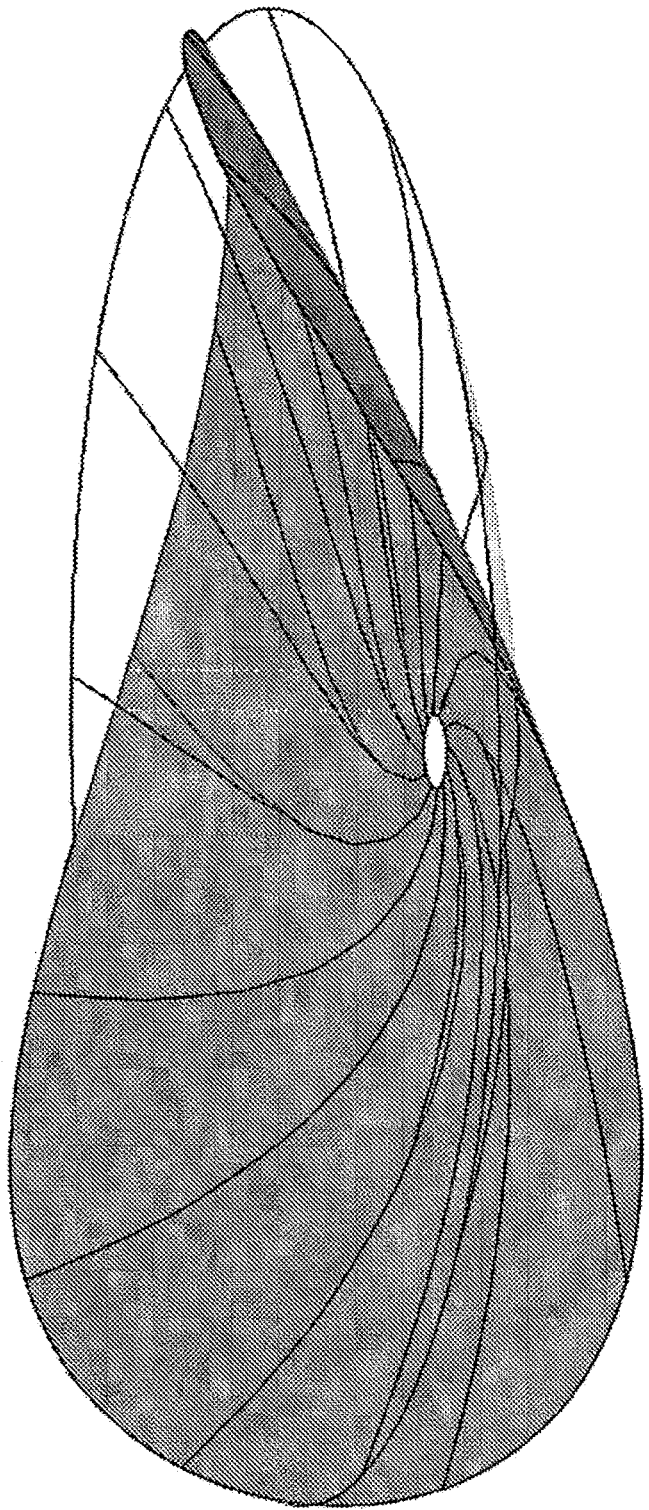
FIG. 8 is a drawing showing an exemplary DSC modal analysis.

FIG. 8 is a drawing showing an exemplary DSC modal analysis showing a 4.2 Hz first mode frequency. The DSC can also achieve an impressive first mode vibration frequency of 4.2 Hz, FIG. 8, when constrained at the open hole boundary.

A DSC according to the Application was also evaluated for deformations in gravity. FIG. 9A and FIG. 9B show the DSC loaded in cup-up and cup-down configurations. FIG. 9A is a drawing showing an exemplary DSC gravity deformation analysis in a cup-down configuration. FIG. 9B is a drawing showing an exemplary DSC gravity deformation analysis in a cup-up configuration. In the cup-down configuration, maximum deformations are slightly less than thermal deformations at 0.13 mm. In the cup-up configuration, deformations are slightly larger at 0.17 mm.

A base reflector surface can be a carbon fiber composite material, very thin, but conductive. There are existing methods, such as physical vapor deposition and electroplating, to apply a mirror-like reflective surface coatings to composite reflectors. Physical vapor deposition can be used to apply a reflective coating directly to a composite substrate, and the reflectivity of the final surface is strongly determined by the pre-coating finish of the composite substrate. Production tooling can also be polished to provide a smooth reflector finish. Additionally, a thin resin coating can be applied over the reflector surface pre-coating to smooth any rough spots. Electroplating can also be used to apply a reflective surface to composites, however in the case of electroplating, an initial conductive coating should be applied first.

A low cost 1 m high compaction ratio parabolic reflector can be made according to the new structures and materials of the Application. Low cost is an important feature in many applications, such as, for example, for a DSC reflector. Relatively low cost DSCs can be fabricated using standard prepreg materials in either a laser guided hand-layup process or automated tape process. Recent implementations suggest that a layup is expected to take a skilled technician about 1-2 days for a finished part that will need minimal post-processing.

Figure 10:
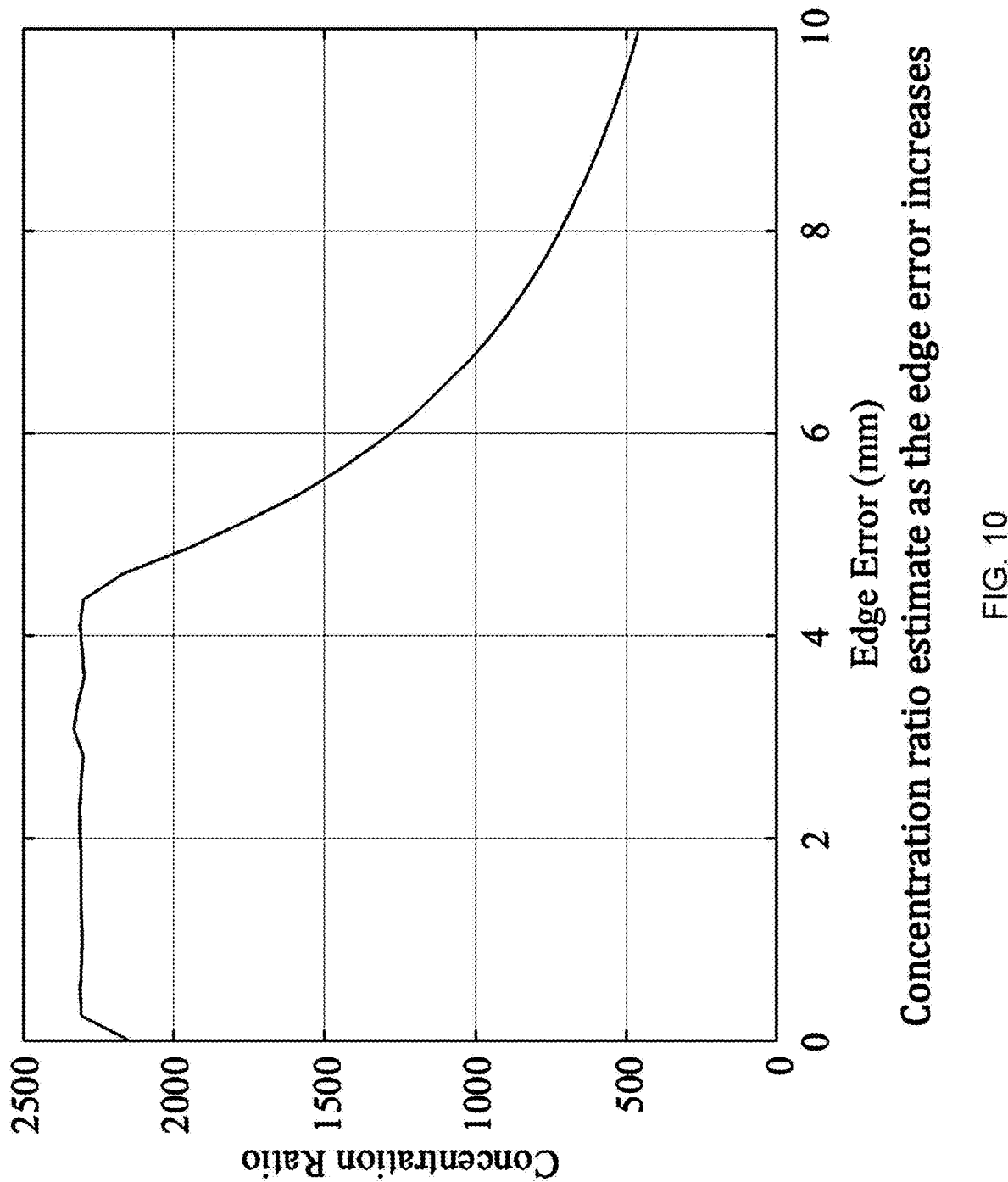
FIG. 10 is a graph showing an exemplary concentration estimate as the edge error increases.

Estimated Concentration Ratio—Expected concentration ratio has been estimated for a DSC according to the application using ray tracing analysis. The sun was treated as an extended source, which limits the concentration ratio to a finite number, even for a perfect mirror. The modeled mirror was assumed to have an axisymmetric error, which scaled with the edge error. The results are shown in FIG. 10, a graph showing an exemplary concentration estimate as the edge error increases. Though preliminary, the analysis, combined with the estimated gravity deflection of 0.17 mm, supports the feasibility of the proposed innovation.

Figure 12A:
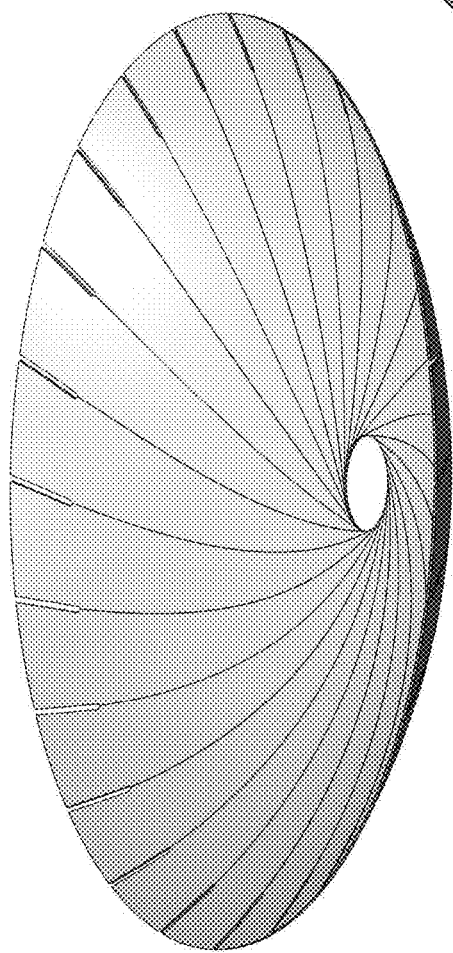
FIG. 12A is a drawing showing an isometric view of a reflector that has thin U shaped relief slots near the outer diameter.
Figure 12B:
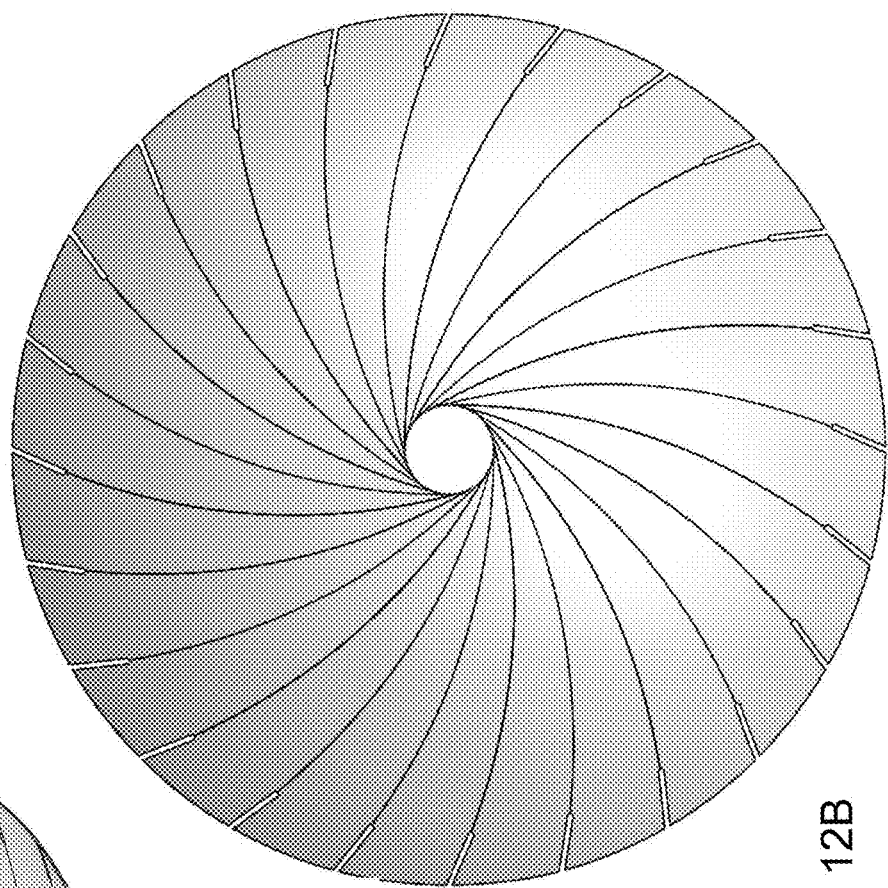
FIG. 12B is a drawing showing a top view of the reflector of FIG. 12A.

Slots—Open slots as relief cuts can be introduced near the outside diameter of a foldable reflector according to the application. In other words, the fold lines 102 can end in open slots, also called relief cuts, between the gores 100. FIG. 11 is a drawing showing a V shaped slot 108 at the outer edges of a reflector. Such slots 108 can be U shaped, rectangular shaped, etc. FIG. 12A and FIG. 12B show a reflector have thin U shaped slots near the outer diameter. FIG. 12A is a drawing showing an isometric view of a reflector have thin U shaped relief slots near the outer diameter. FIG. 12B is a drawing showing a top view of the reflector of FIG. 12A. End slots near the outer perimeter of the foldable reflector towards the outer ends of the fold lines are most useful to more tightly fold. Foldable reflectors without slots do not fold as tight as reflectors with slots.

Perimeter structure—There can also be an annular structure added around the perimeter of reflector according to the Application. For example, there can be an annular tape spring (TS) with a C cross section around the perimeter. The perimeter structure can provide a positive force to overcome residual forces of the hinges. For example, the perimeter structure, such as a TS, can provide a positive force that causes the reflector to snap open with the gores in place of the deployed reflector. A TS can also lock the reflector in the deployed open reflector state.

Figure 13:
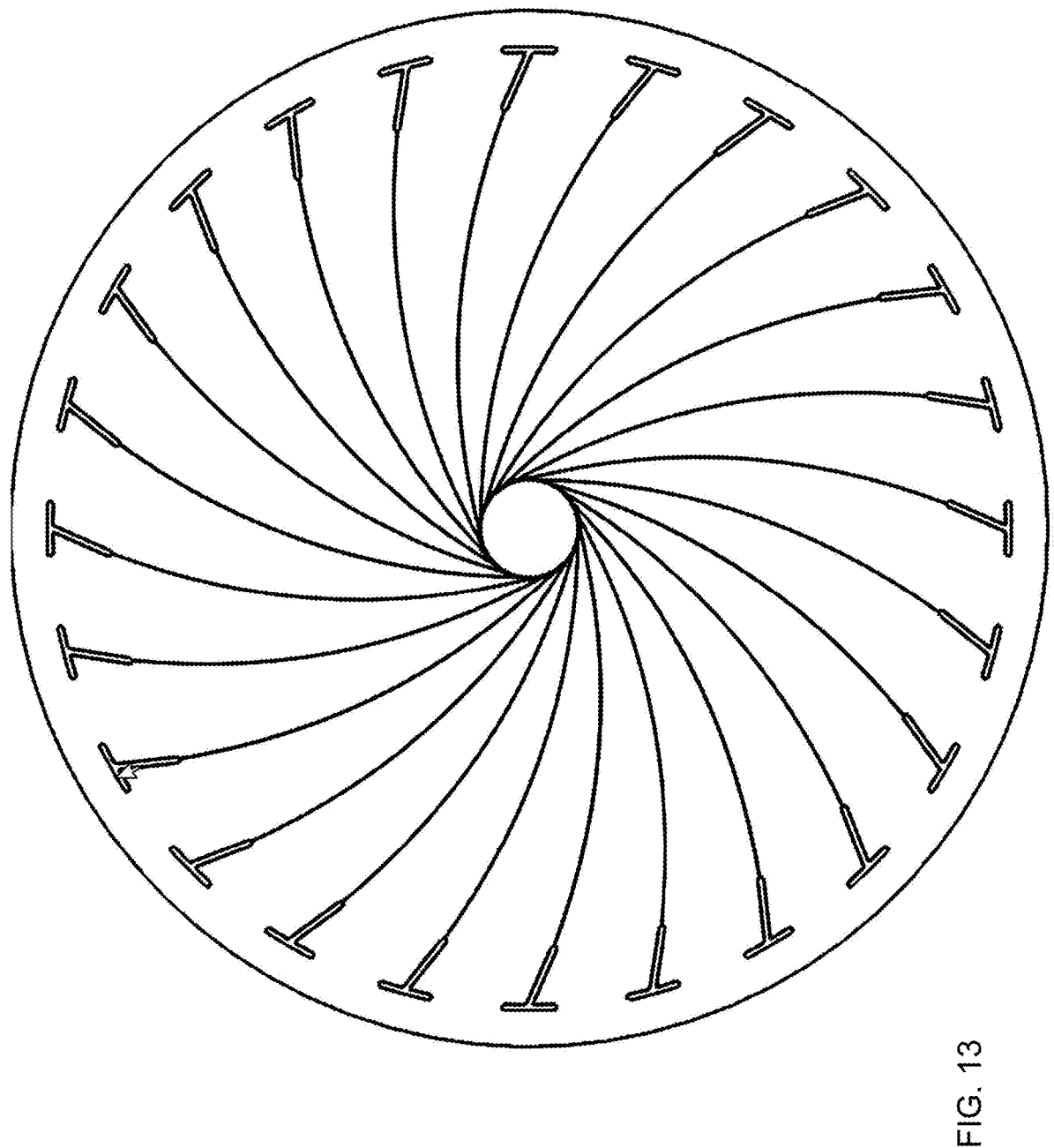
FIG. 13 is a drawing showing a top view of a reflector with an exemplary TEE slot perimeter structure.

FIG. 13 is a drawing showing a top view of a reflector with an exemplary Tee slot perimeter structure because the slot resembles a "T" shape.

Figures 14A, 14B:
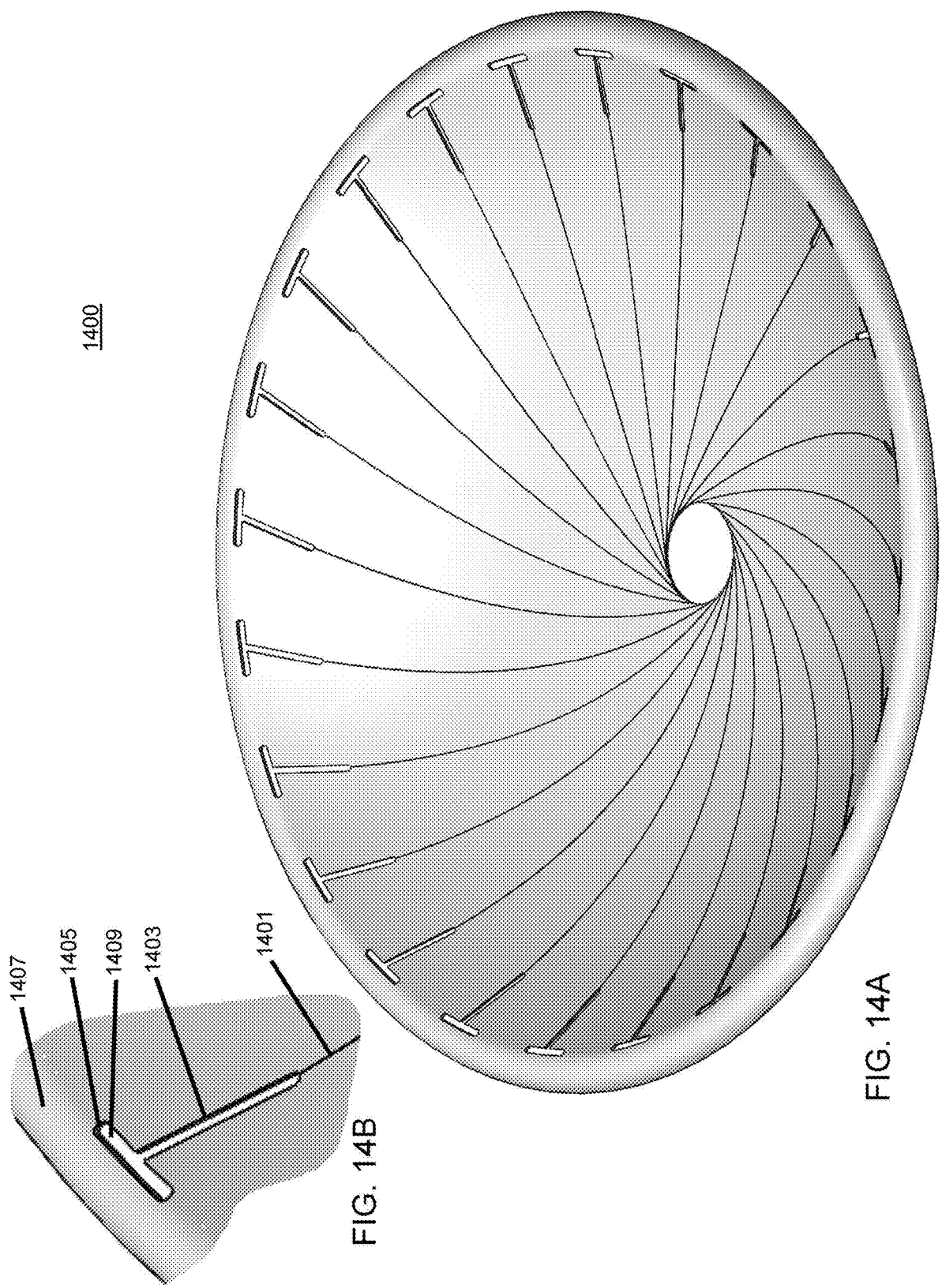
FIG. 14A is a drawing showing an isometric view of a reflector similar to the reflector of FIG. 13.
FIG. 14B is a detail drawing of one TEE slot of FIG. 14A.

FIG. 14A is a drawing showing an isometric view of a reflector 1400 similar to the reflector of FIG. 13. FIG. 14B is a detail drawing of one "T" of FIG. 14A. Fold line 1401 ends in a thin "U" shaped relief slot 1403. There is an additional rounded rectangular slot 1405 defining an about rectangular or oval opening 1409, followed by a perimeter annular tape spring with a C cross section 1407. Analogous to the way the annular tape spring of a tape measure fixes the extended measuring tape as a beam, here, the annular tape spring with a C cross section around the perimeter can serve to positively spring bias a mostly open reflector to the reflector open position. The perimeter structure can also lock the reflector into a fully deployed open reflector. Biasing and/or locking perimeter structures can be more important as the reflectors become larger in size and are somewhat less important for relatively small reflectors.

Figure 15B:
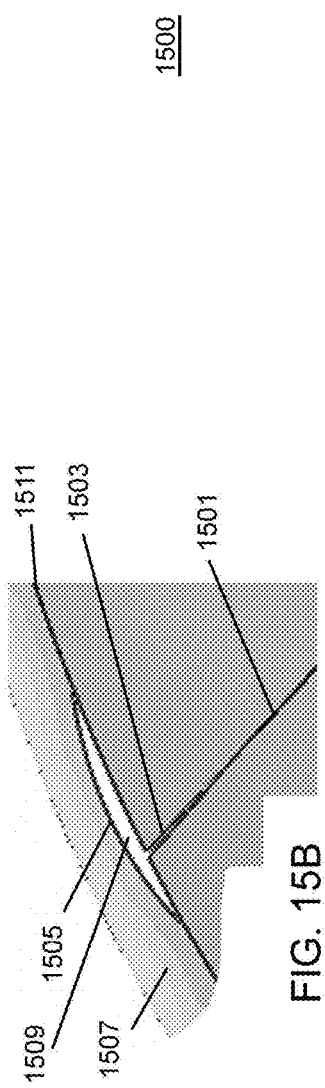
FIG. 15B is a detail drawing of a perimeter structure of FIG. 15A.
Figure 15A:
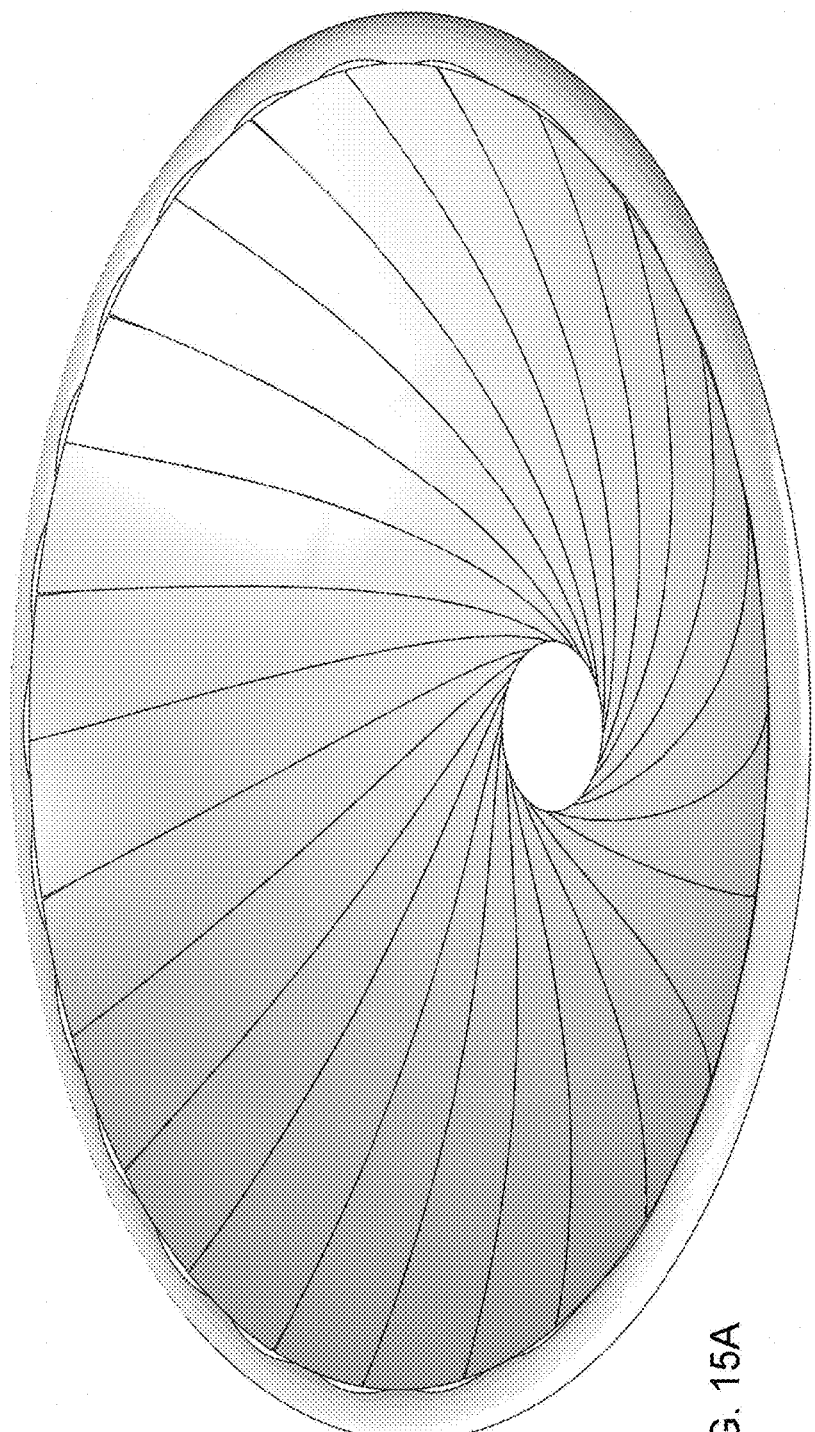
FIG. 15A is a drawing showing another exemplary perimeter structure with a tape spring (TS) edge.

FIG. 15A is a drawing showing another exemplary perimeter structure with a tape spring (TS) edge. Similar to the TEE slots of FIG. 14, there is an annular tape spring with a C cross section around the perimeter. However, the curves at the end of each fold line are more rounded now.

FIG. 15B is a detail drawing of a perimeter structure of FIG. 15A. Fold line 1501 ends in a thin "V" shaped relief slot 1503. There is an additional rounded rectangular slot 1505 defining an about arc or C shaped opening 1509, followed by a perimeter annular tape spring with a C cross section 1507.

Figure 15D:
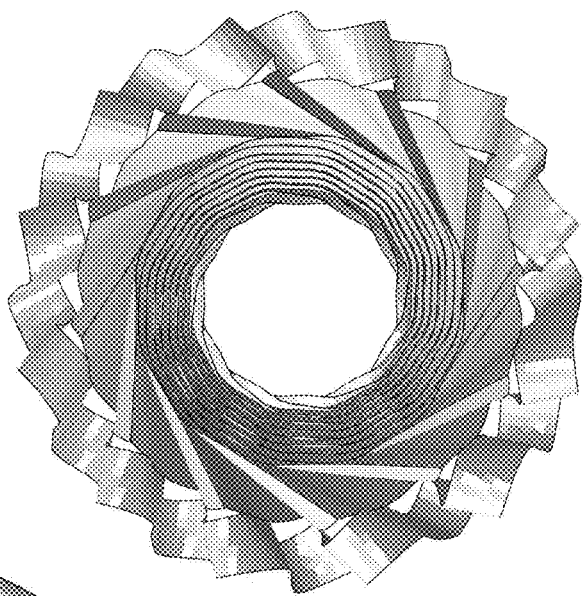
FIG. 15D is a drawing showing a top view of the reflector of FIG. 15C folded and rolled.
Figure 15C:
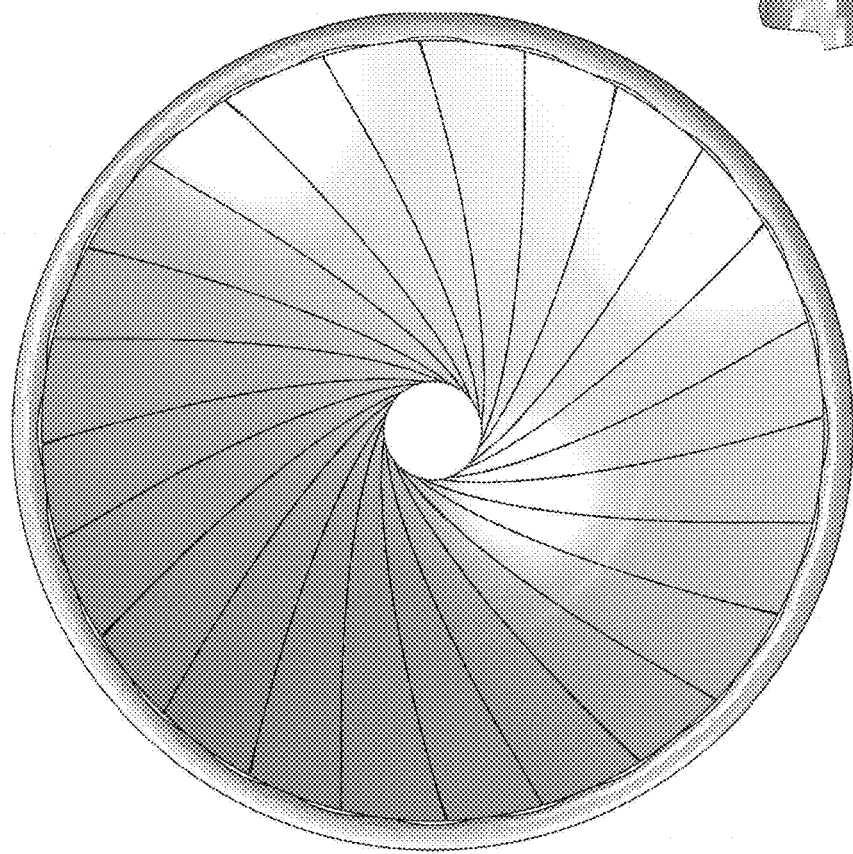
FIG. 15C is a drawing showing a top view of the reflector of FIG. 15B.
Figure 15E:
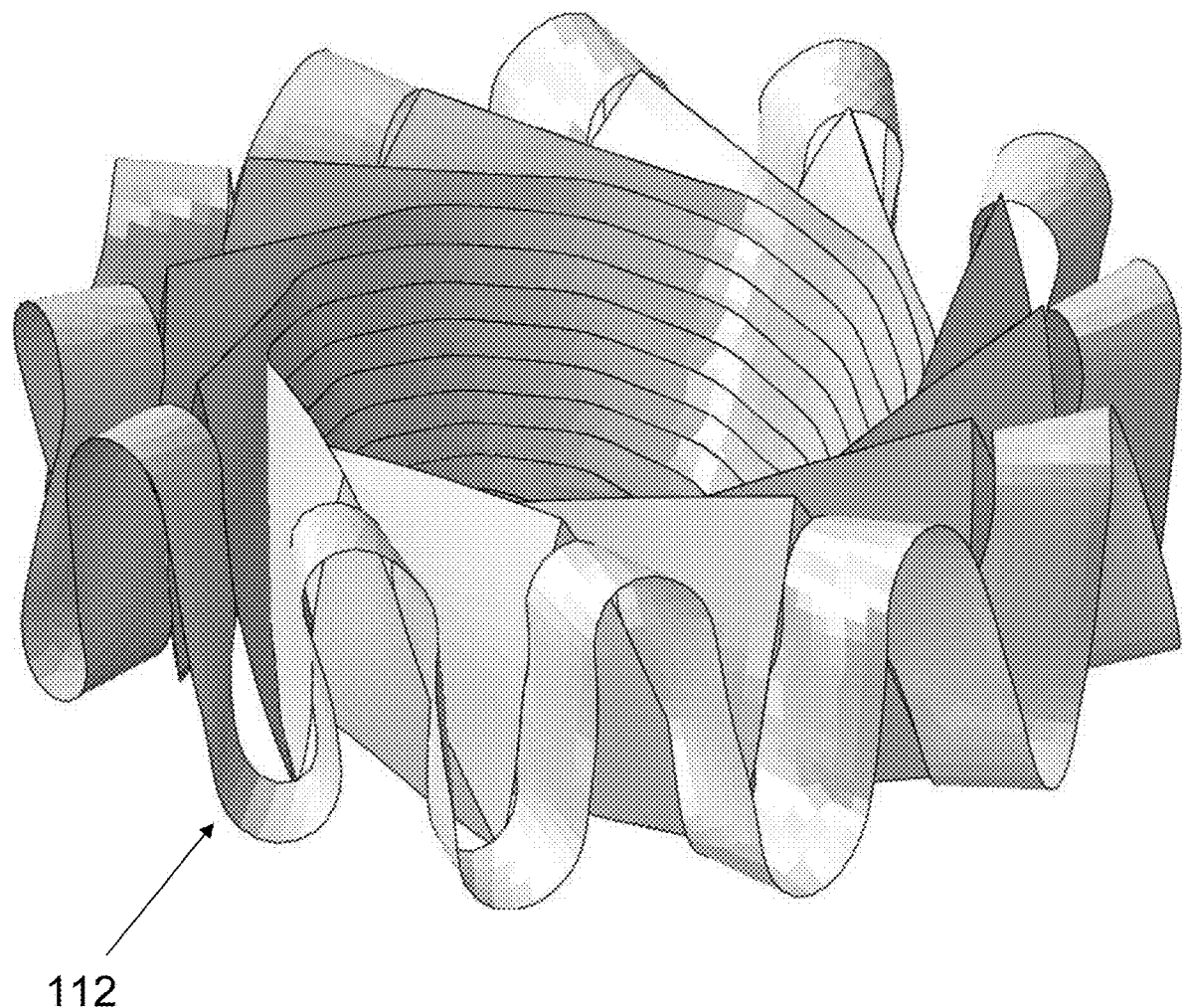
FIG. 15E is a drawing showing an isometric view of the folded reflector of FIG.

FIG. 15C is a drawing showing a top view of the reflector of FIG. 15B. FIG. is a drawing showing a top view of the reflector of FIG. 15C folded and rolled. FIG. 15E is a drawing showing an isometric view of the folded reflector of FIG. 15D. Note how the gores 100 of the reflector folding along the fold lines fold as described hereinabove, while the annular tape spring with a C cross section around the perimeter Z folds 112.

C structures and Z folds were described in U.S. Pat. No. 10,526,785 B2, DEFORMABLE STRUCTURES, which is also assigned to Opterus Research and Development, Inc. While those deformable structures generally unfurled as beams, as described in this Application, it has been realized that there can also be circular (perimeter) deformable structures, such as to spring bias open a reflector towards an open locked state. The '785 patent is incorporated herein by reference in its entirety for all purposes. C structures with Z folds are but one example of a perimeter structure. Any suitable deformable shaped structure in with any suitable fold can be used for a perimeter structure of a doubly curved reflector to spring bias a foldable stowable doubly curved reflector to a doubly curved reflector open state.

Wrinkles—One of the problems with theoretical models for foldable reflectors, including models which yield fold lines, is that when made from many materials which are otherwise near optimal for many foldable reflector applications, the reflectors wrinkle when compactly folded along the fold lines. Such wrinkles are not only less efficient for storage, but more importantly can damage the reflector gores. Wrinkles are indicative of improper fold lines and cause significant undesirable and damaging stress at the wrinkle locations.

The advances in hinge technology described hereinabove alone, do not address or solve the wrinkle problem. During experimentation with the materials described hereinabove, finite element analysis simulations were made to better understand why the fold line models of the prior art do not work in practice for a wrinkle free fold. While the theoretical details of wrinkle minimization are still not completely understood, a new method was developed to modify theoretical modeled fold lines to first achieve wrinkle free folding for many new materials, such as carbon composite materials useful for hinges and gores.

It was realized that material properties can be accounted for by varying the slope of the ends of the fold lines in an iterative process, each iteration performing a new calculation with a finite element analysis computer process that includes material properties.

The first step in a new reflector design is to use a model of the prior art based on desired reflector parameters. Dr. Manan Arya of JPL has pioneered use of such theoretical models, and many of the fold lines designs implemented to date begin by running one of Arya's model for the desired reflector parameters to produce an initial set of theoretical fold lines. Arya's models are largely based on Wataru's theoretical modeling as has been described, for example, in "A Study of Deployment of Membrane Stowed by Multi-Spiral Folding Lines Considering Thickness Effects" by Wataru, et. al.

The theoretical models accept as input several parameters, for example, outer diameter (the radius of the reflector), inner radius (a radius of the inner round opening of a reflector), the depth of the reflector (shallower or deeper), number of gores, thickness of the reflector skin, and distance between layers of the folded cylinder.

Figure 16:
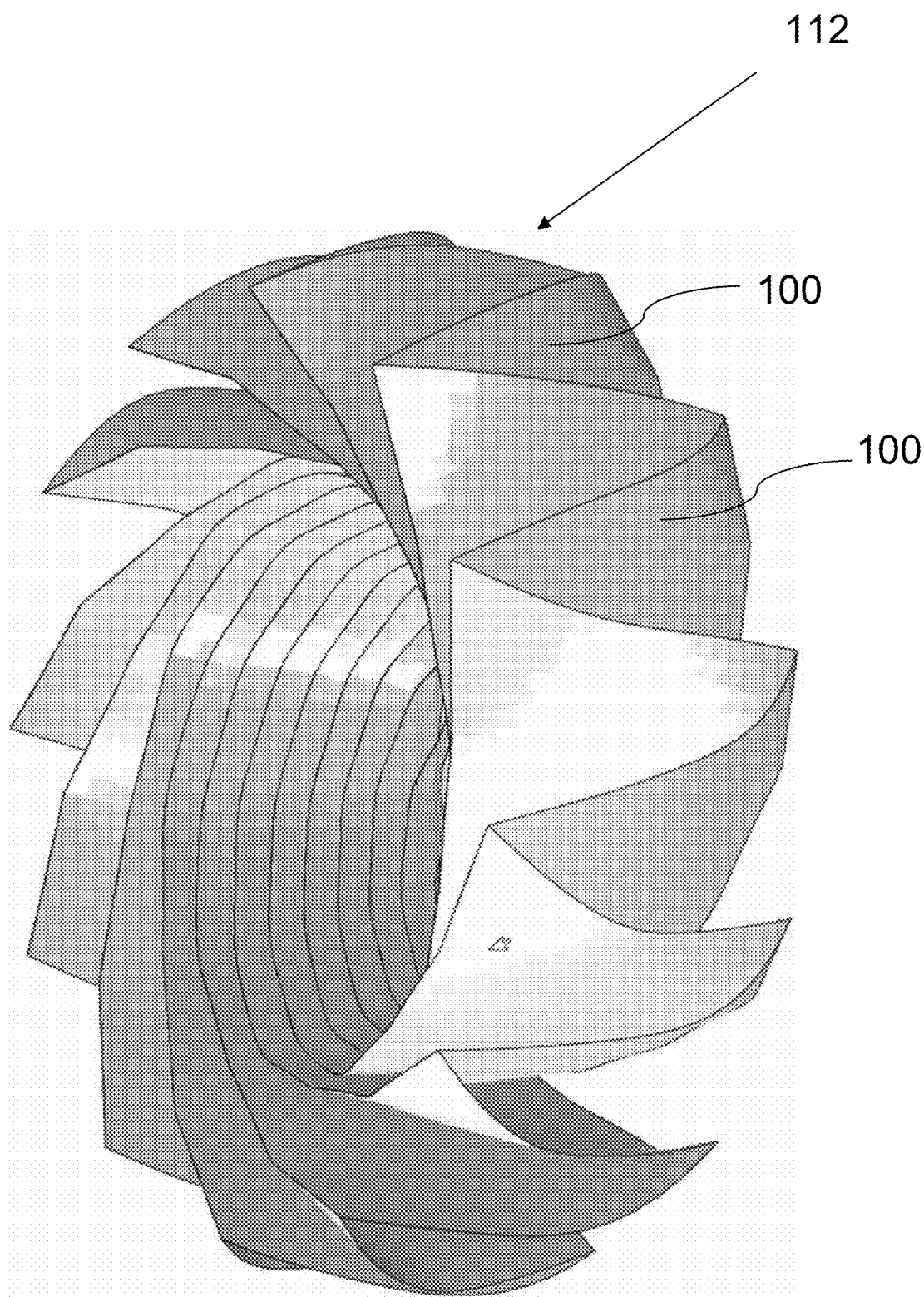
FIG. 16 is an exemplary drawing showing a wrinkled folded reflector based on theoretical fold lines and then modeled in practical materials.

FIG. 16 is an exemplary drawing showing a wrinkled folded reflector based on theoretical fold lines and then modeled in practical materials.

These theoretical models are based on kinematic analysis. Kinematic analysis does not consider or include material characteristics and properties, such as material properties in deformation. The theoretical models (e.g., Arya, Wataru) typically create a theoretical tessellated or faceted model such as based on a relatively large number of triangles.

Theoretical models are derived by considering the surface to be in-extensional, but free to bend. Kinematic compatibility is enforced between the wrapped and unfolded states. The resulting effective paraboloids are composed of singly curved gores. Also, each gore based on past theoretical models is generally made from a flat sheet of paper. Flat sheets can only be singly curved, which can create an effective parabola.

However, the behavior of an elastic doubly curved surface is generally too complex to write well defined equations, such as in Wataru. However, it was realized that the problem of folding an elastic doubly curved surface using materials beyond paper sheets, can be solved numerically, for example using an iterative finite element based approach. It was realized that the theoretical fold lines for gores can be modeled along with the actual material properties of the reflector materials to be used in a finite element analysis computer process, such as, for example, Abaqus FEA available from Dassault Systèmes Americas Corporation of Waltham, MA. Any suitable general finite element analysis (FEA) modeling process or program can be used.

Using FEA analysis and modeling, it was realized that both singly curved flat gores, and doubly curved gores (individual gores where each gore has two radii) can be used.

Figure 17:
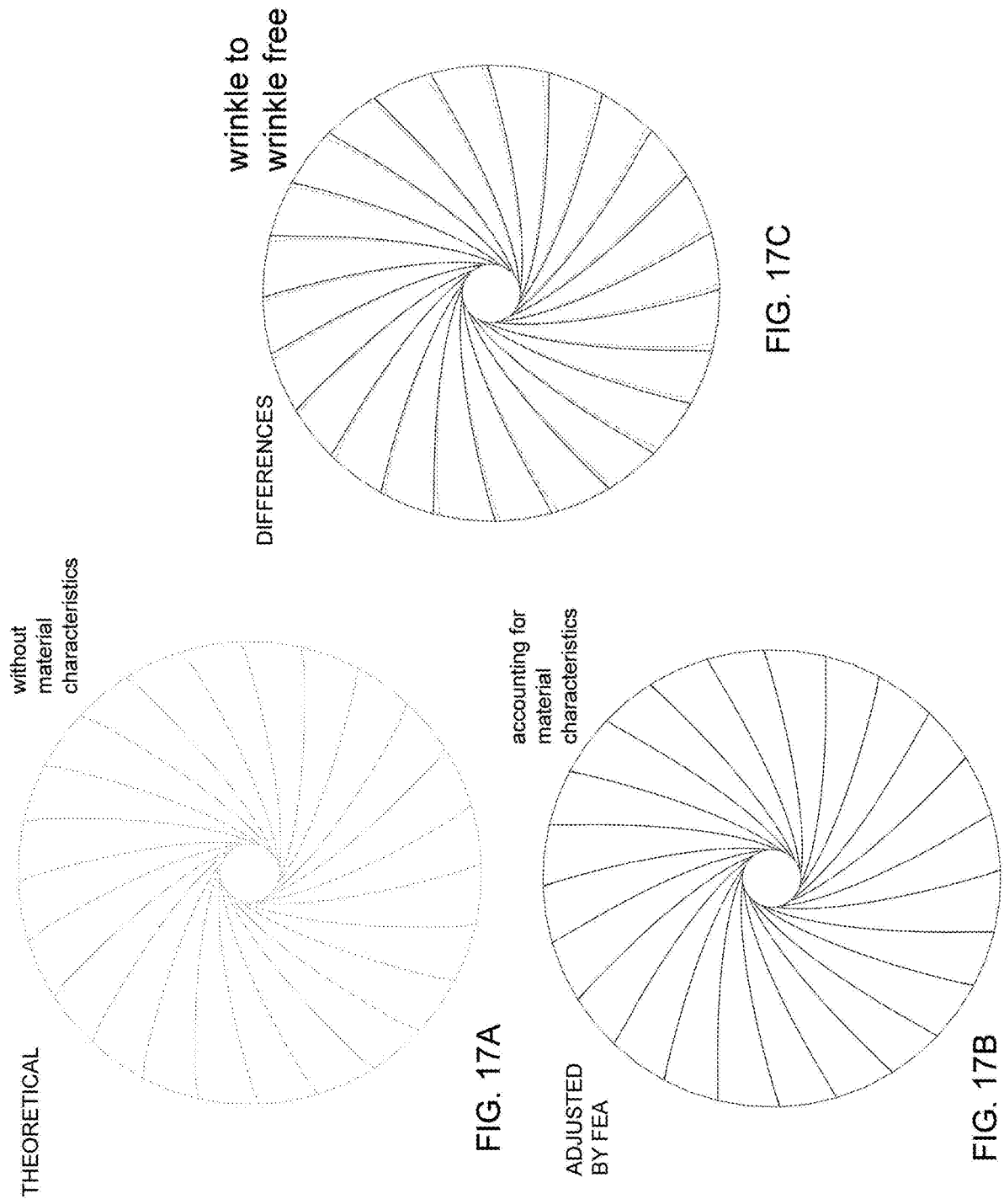
FIG. 17A is a drawing showing an exemplary theoretical fold line pattern which does not take into account material characteristics.
FIG. 17B is a drawing showing the fold lines of FIG. 17A adjusted by FEA to take into account material characteristics for a foldable reflector which substantially does not wrinkle when folded.
FIG. 17C is a drawing shows the fold lines of FIG. 17B overlapped over the fold lines FIG. 17A for comparison.

FIG. 17A is a drawing showing an exemplary theoretical fold line pattern which does not take into account material characteristics. FIG. 17B is a drawing showing the fold lines of FIG. 17A adjusted by FEA to take into account material characteristics for a foldable reflector which substantially does not wrinkle when folded. FIG. 17C is a drawing shows the fold lines of FIG. 17B overlapped over the fold lines FIG. 17A for comparison.

Figure 18:
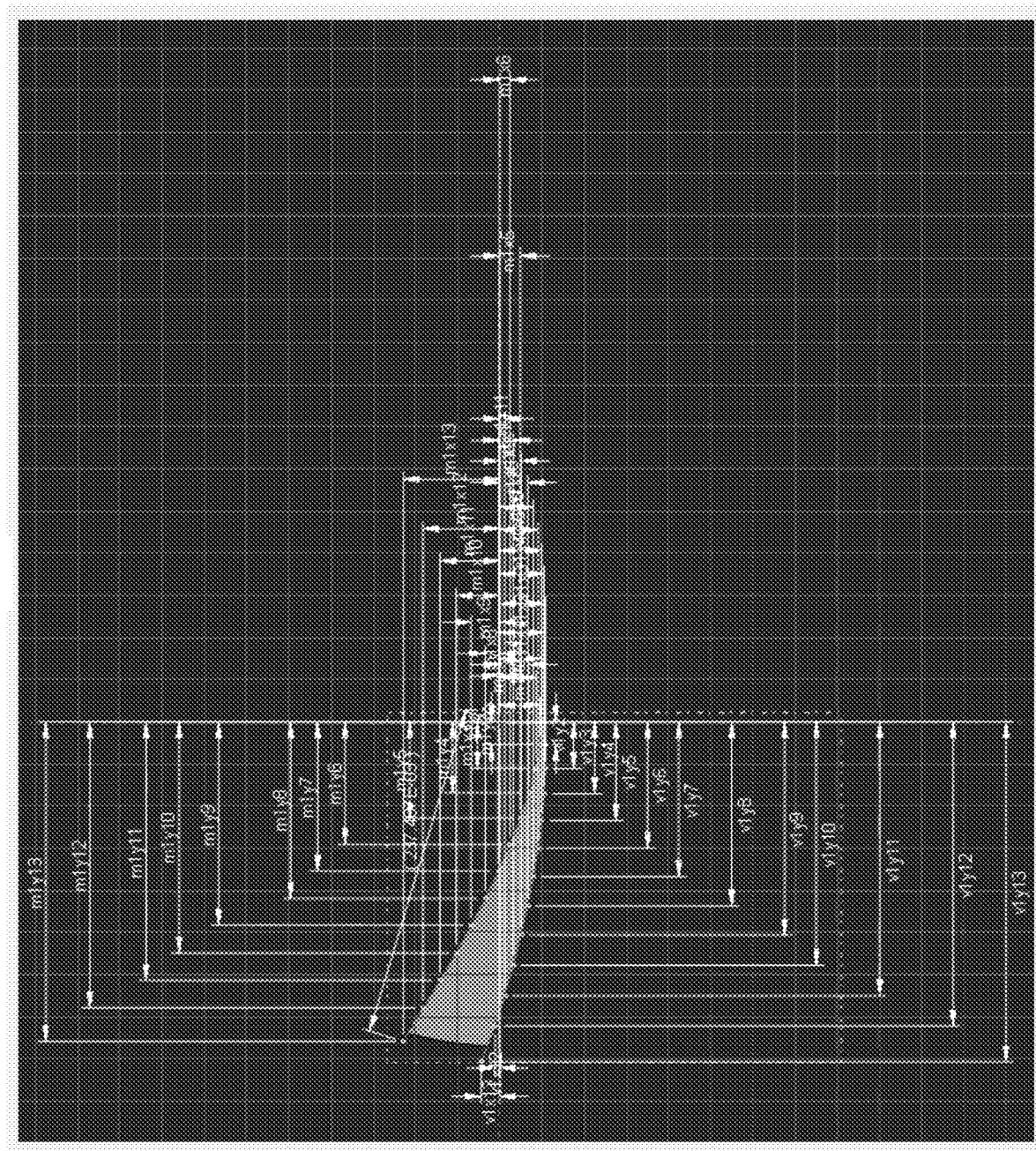
FIG. 18 is a drawing showing an exemplary individual gore undergoing FEA.
Figure 19:
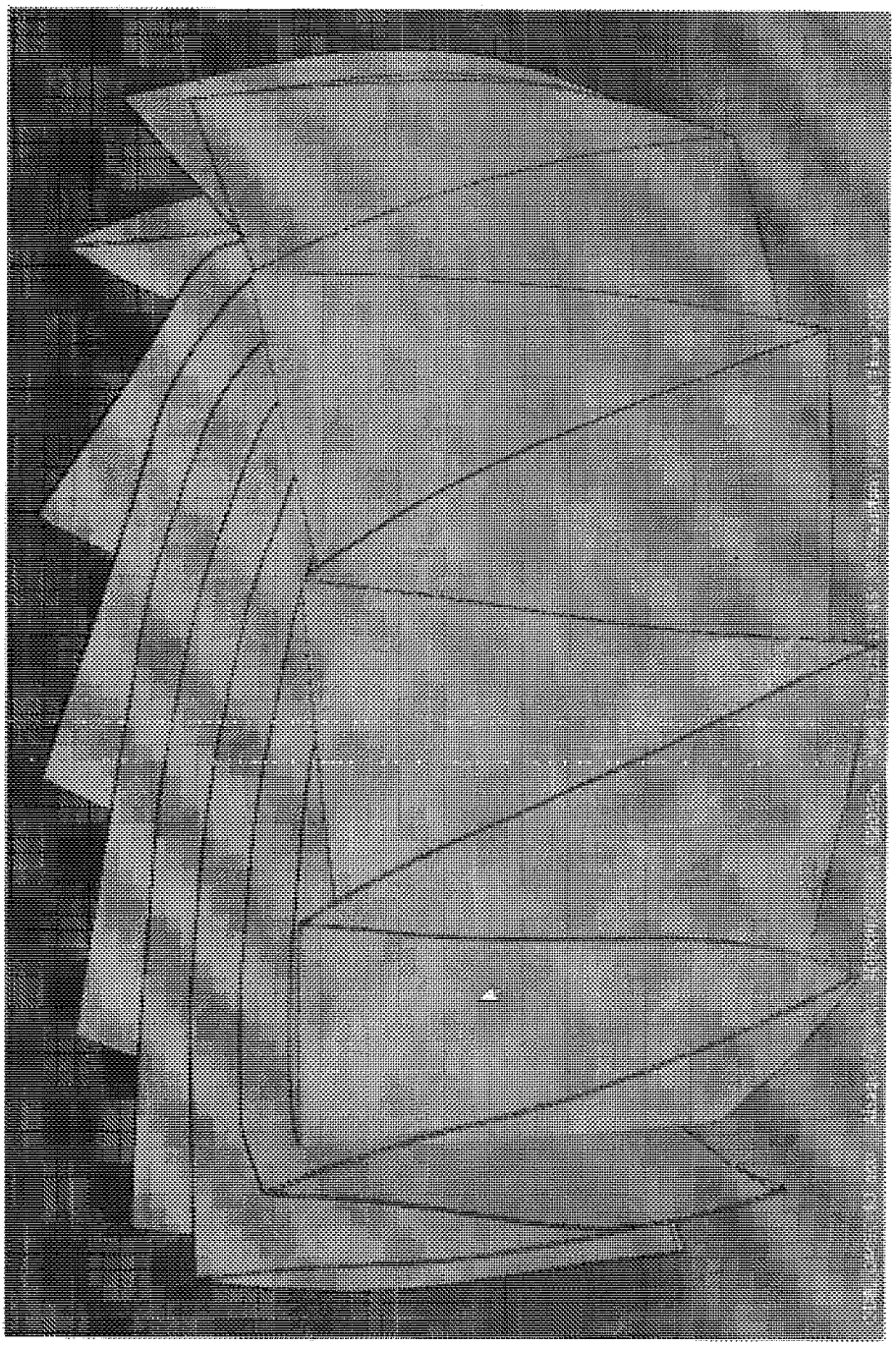
FIG. 19 is an exemplary drawing showing a substantially wrinkle free folded reflector following iterative steps of FEA.

FIG. 18 is a drawing showing a gore undergoing FEA. It was further realized that by slightly and iteratively changing the slope of the ends of the fold lines for any given material, and iteratively re-running the FEA after each slope change, that we could achieve wrinkle free folding. FIG. 19 is an exemplary drawing showing a substantially wrinkle free folded reflector following iterative steps of FEA where the slope of the ends of each fold lines were gradually changed each step until the wrinkles of the modeled folded reflector were substantially removed.

Figure 20:
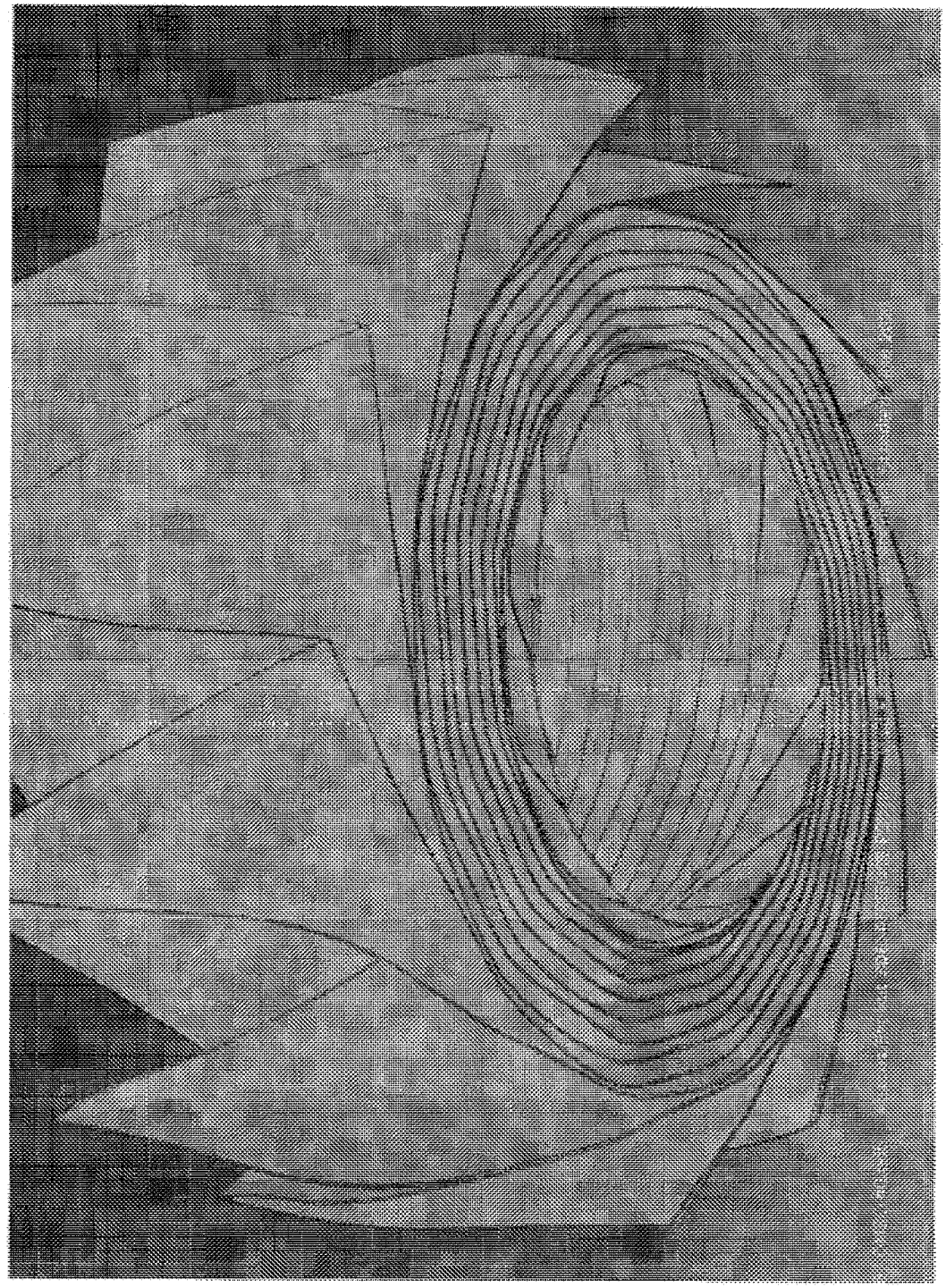
FIG. 20 is a drawing showing a compact folded reflector where slots can be seen at the ends of the fold lines.
Figure 21:
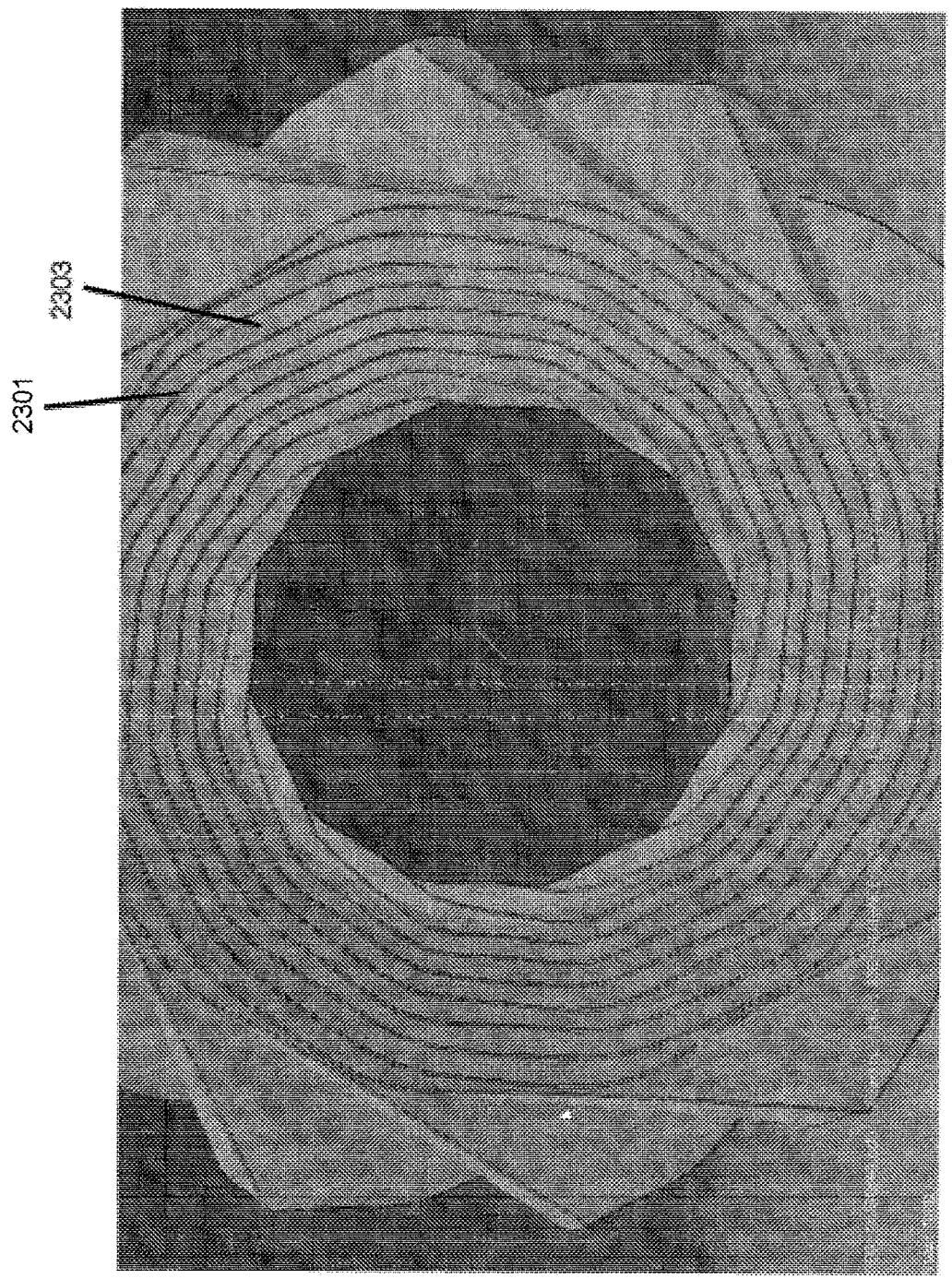
FIG. 21 is a drawing showing an end view of the folded reflector cylinder.

Moreover, by introduction of slots near the ends of the fold lines as described hereinabove, there was further improvement in folding, including a more compact folding. FIG. 20 is a drawing showing a compact folded reflector where slots can be seen at the ends of the fold lines. FIG. 21 is a drawing showing an end view of the folded reflector cylinder. The closely spaced lines represent the thickness of the material of the reflector skin. The wider areas between the thin parallel lines represent open space between the gores at the end of the cylinder. These structures have some similarity to thick origami, however the folded reflectors of the Application now also take into account material deformability, such as for example material deformability of carbon composite epoxy gores.

Methods of Manufacture

After the gore lines have been determined for actual reflector materials to be used, gores can be cut from sheets of the material by any suitable means. Automated computer controlled cutting tools, such as those available from Eastman Machine Company of Buffalo, NY have been used. Any suitable cutting method or technique can be used. Such methods and techniques can vary for the material used to make the gores.

Doubly curved gores—Gores according to the Application can be made as doubly curved gores (as opposed to flat sheet gores) to yield true paraboloids unfurled. We also realized a system for fabricating the foldable reflectors with hinges according to the Application but fabricating each reflector with its hinges on a form which has the same curvature as the finished reflector.

Figure 22:
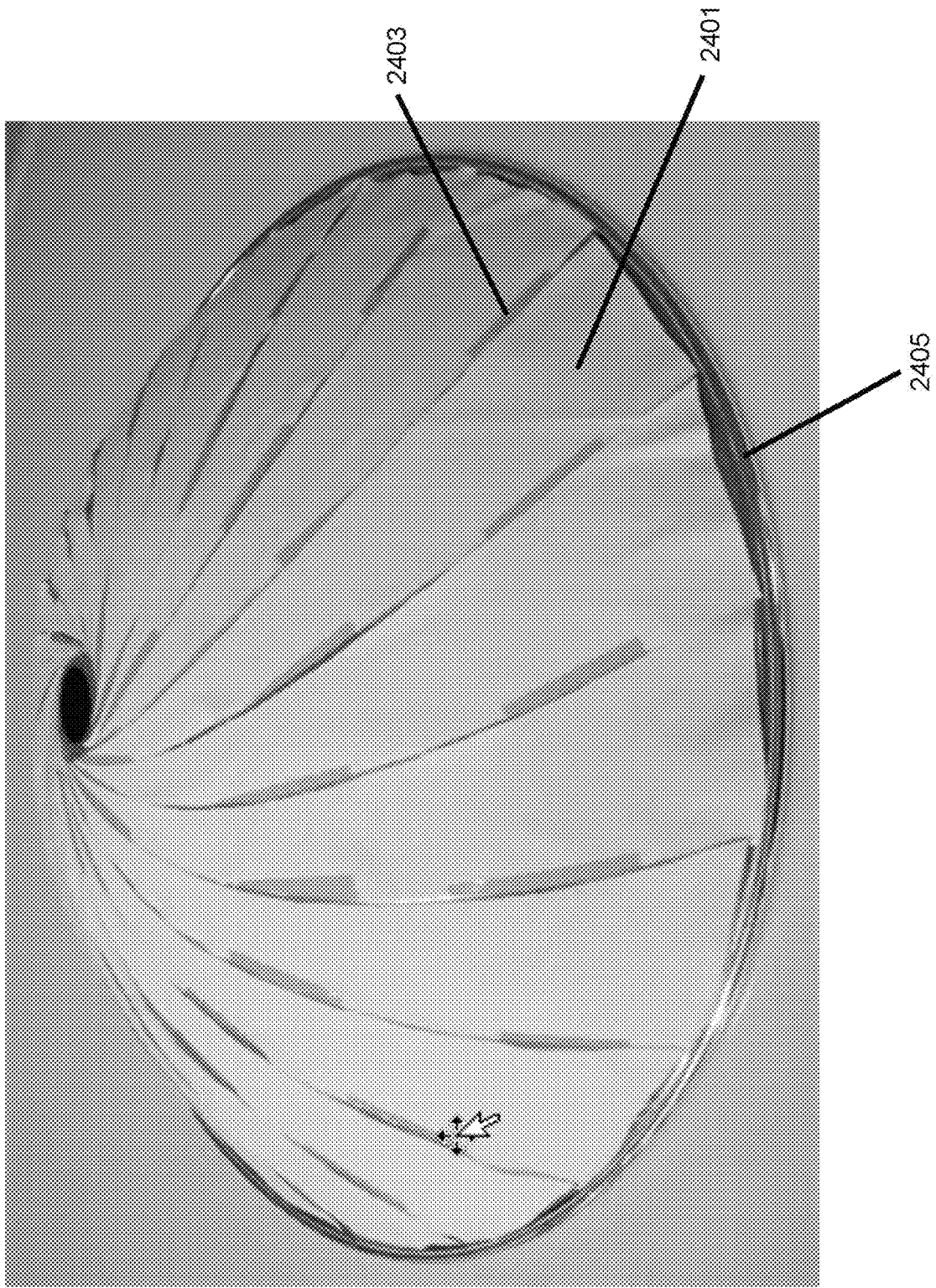
FIG. 22 is a drawing showing paper gores which simulate prepreg draping over a reflector mold.

FIG. 22 is a drawing showing paper gores which simulate prepreg draping which can accept a carbon/epoxy material applied in a process analogous to fabricating fiberglass. Here, hinges were cut from sheet Kapton™.

The exemplary FEA adjustment of curves and fabrication of reflector gores on a reflector form highlight the desired nature of the doubly curved foldable reflector structures of the Application. The final smooth unfolded structures combined with substantially wrinkle free folded structures meet the definition of doubly folded structures which present as continuous undistorted curves in three-dimensions.

Part 2.3—Applications—Parabolic shells are broadly useful for concentrating energy across the electromagnetic spectrum, and traditional reflectors have been used to concentrate radio waves for communication and light to produce heat. Parabolic reflectors have, thus far, primarily been used in space missions for communication, but are currently sought for production of heat, as a method of producing oxygen from lunar regolith. The technologies that support DSC are applicable to antenna reflectors and solar concentrators, though they are proposed here only for solar concentrators. As such, they are highly relevant to NASA's Moon to Mars mission. The DSC concept is robust, scalable and cost effective. Thin ply composite solar concentrators offer a reflector compromise that is lightweight and accurate, which has previously been unavailable for space applications. The proposed innovations allow the reflector to fold, which supports the stowing for launch.

While the concept is compatible with a broad range of concentrator sizes, above a certain size DSC will likely require backing support, which will increase the mass of the concept. DSC is most suitable for applications that allow medium-size reflectors (on the order of 1 m) to be combined in arrays, to produce the most mass-efficient design.

The same technologies are relevant to NASA communication needs for small satellite missions. The advances made in work done under this proposal are directly applicable to development of low cost deployable reflector antennas for CubeSats, NanoSats or SmallSats. At smaller sizes (up to 0.7 m diameter, suitable for upper band operation), DSC could stow within a 1 U volume.

Potential Spacecraft Applications—A DSC is expected to see use in NASA lunar missions as part of a solar concentrator system to extract oxygen from lunar regolith. Where state of the art for solar concentrators have been Earth-focused and existing concentrators are too heavy and large to be launched to the moon a DSC according to the application is light weight and foldable such that it is suitable for missions such as NASA's Moon to Mars mission. A DSC according to the Application is also suitable for ice melting missions on Mars or in the asteroid belt.

The DSC fold pattern, hinge design and thin ply construction allows a thin parabolic shell to fold into a tight package. While a target application for reflectors according to the Application is light concentration for the purpose of extracting oxygen from lunar regolith, the technology is also broadly applicable to communications missions and radar applications including synthetic aperture radar (SAR) imaging. These applications are of high interest among both, the commercial sector and the Department of Defense. Low earth orbit constellations are sought for communication, imagery, and ground and air moving target applications. These missions now more often target lower orbits where the antenna system, and the entire spacecraft, can be smaller, lower power, and lower cost. These systems often have short lives by design due to orbit decay and the need to revise the systems with new technology. Low cost antennas are key to the success of these high quantity systems because they cannot shoulder the financial burden associated with high numbers of mesh reflectors. Due to the high degree of touch labor, the cost of mesh reflector systems does not appreciably decrease with quantity. DSC-style reflectors, however, cost less per unit when made in multiples.

Software and models used for generating fold lines and various analysis, such as FAE, and stress models, can be provided on a computer readable non-transitory storage medium. A computer readable non-transitory storage medium as non-transitory data storage includes any data stored on any suitable media in a non-fleeting manner Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A reflector apparatus, which comprises: a plurality of reflective gores arranged about a central axis, adjacent reflective gores connected to each other by a hinge extending between the adjacent reflective grooves to enable the reflective gores to transition between an open reflected condition and a closed stowed condition; wherein, in the open reflected condition, the reflective gores are open and extend outwardly relative to the central axis; and wherein, in the closed stowed condition, the reflective gores fold onto each other to define a substantially nested structure, wherein:

the hinge comprises an arcuate roll hinge, and the arcuate roll hinge defines a first thickness and the adjacent reflective gores each define a second thickness greater than the first thickness of the arcuate roll hinge.

2. The reflector apparatus according to claim 1 wherein the arcuate roll hinge is a living hinge.

3. The reflector apparatus according to claim 1 wherein the arcuate roll hinge comprises at least one stress relieving hinge slit.

4. The reflector apparatus according to claim 3 wherein the arcuate roll hinge comprises a plurality of stress relieving hinge slits.

5. The reflector apparatus according to claim 3 wherein the at least one stress relieving hinge slit comprises a transverse stress relieving hinge slit.

6. The reflector apparatus according to claim 1 wherein the substantially nested structure defined by the reflective gores in the closed stowed condition is substantially cylindrical.

7. The reflector apparatus according to claim 1 wherein adjacent reflective gores define a slot extending therebetween and extending to a periphery of the adjacent reflective gores.

8. The reflector apparatus according to claim 1 wherein, in the open reflected condition, at least some of the reflective gores define a double curved reflector surface.

9. A reflector apparatus, which comprises:
- a plurality of reflective gores arranged about a central axis, adjacent reflective gores connected to each other by a hinge extending between the adjacent reflective grooves to enable the reflective gores to transition between an open reflected condition and a closed stowed condition; wherein, in the open reflected condition, the reflective gores are open and extend outwardly relative to the central axis; and wherein, in the closed stowed condition, the reflective gores fold onto each other to define a substantially nested structure,
- a perimeter spring member extending about and coupled to a peripheral segment of the reflective gores, the perimeter spring biasing the reflective gores toward the open reflected condition, wherein:
- the hinge comprises an arcuate roll hinge, and
- the perimeter spring comprises TEE slots.

10. The reflector apparatus according to claim 9 wherein the perimeter spring comprises a C curve.

11. The reflector apparatus according to claim 9 wherein the perimeter spring is folded in Z folds when in the closed stowed condition.

12. A reflector apparatus, which comprises:
- a plurality of reflective gores arranged about a central axis, adjacent reflective gores connected to each other by a hinge extending between the adjacent reflective grooves to enable the reflective gores to transition between an open reflected condition and a closed stowed condition; wherein, in the open reflected condition, the reflective gores are open and extend outwardly relative to the central axis; and wherein, in the closed stowed condition, the reflective gores fold onto each other to define a substantially nested structure,
- a perimeter spring member extending about and coupled to a peripheral segment of the reflective gores, the perimeter spring biasing the reflective gores toward the open reflected condition, wherein:
- the hinge comprises an arcuate roll hinge, and
- the perimeter spring comprises a TS edge.

13. The reflector apparatus according to claim 12 wherein the perimeter spring comprises a C curve.

14. The reflector apparatus according to claim 12 wherein the perimeter spring is folded in Z folds when in the closed stowed condition.

* * * * *